United States Patent
Fujimoto et al.

(10) Patent No.: US 8,360,218 B2
(45) Date of Patent: *Jan. 29, 2013

(54) STRUCTURE FOR DISPOSING CLUTCH CONTROL APPARATUS IN POWER UNIT FOR SADDLE-RIDE TYPE VEHICLE

(75) Inventors: Yasushi Fujimoto, Saitama (JP); Atsushi Ogasawara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1160 days.

This patent is subject to a terminal disclaimer.

(21) Appl. No.: 12/239,446

(22) Filed: Sep. 26, 2008

(65) Prior Publication Data

US 2009/0084651 A1 Apr. 2, 2009

(30) Foreign Application Priority Data

Sep. 29, 2007 (JP) ................. 2007-256957

(51) Int. Cl.
*F16D 25/10* (2006.01)
*F16D 25/06* (2006.01)
(52) U.S. Cl. ................. 192/48.611; 192/85.24
(58) Field of Classification Search ............ 192/48.609, 192/48.611, 48.618, 85.24; 180/219
See application file for complete search history.

(56) References Cited

U.S. PATENT DOCUMENTS

| | | | |
|---|---|---|---|
| 7,690,491 B2 * | 4/2010 | Ieda et al. ................. | 192/48.611 |
| 7,861,837 B2 * | 1/2011 | Fraser et al. ............. | 192/48.601 |
| 2003/0131684 A1 * | 7/2003 | Hori et al. ................. | 74/606 R |
| 2006/0219034 A1 * | 10/2006 | Hori et al. ................. | 74/330 |
| 2008/0081714 A1 | 4/2008 | Ogasawara et al. | |
| 2008/0087119 A1 * | 4/2008 | Shiozaki ................. | 74/330 |
| 2008/0099305 A1 * | 5/2008 | Ogasawara ................. | 192/82 R |
| 2008/0099306 A1 * | 5/2008 | Tsukada et al. ............. | 192/82 R |
| 2008/0128239 A1 * | 6/2008 | Ogasawara ................. | 192/85 R |
| 2010/0025180 A1 * | 2/2010 | Kanno et al. ................. | 192/87.11 |

FOREIGN PATENT DOCUMENTS

| | | |
|---|---|---|
| BE | 498527 A | 2/1951 |
| DE | 594 943 C | 3/1934 |
| DE | 10 2007 043 435 A1 | 5/2008 |
| EP | 0 383 576 A1 | 8/1990 |
| EP | 1 101 969 A1 | 5/2001 |
| EP | 1 132 249 A2 | 9/2001 |
| EP | 1 398 519 A2 | 3/2004 |
| EP | 1 826 053 A1 | 8/2007 |
| FR | 2 848 151 A1 | 6/2004 |
| JP | 11-222043 A | 8/1999 |
| JP | 2006-117174 A | 5/2006 |

* cited by examiner

*Primary Examiner* — Ha D Ho
*Assistant Examiner* — Jude Agendia
(74) *Attorney, Agent, or Firm* — Birch, Stewart, Kolasch & Birch, LLP

(57) ABSTRACT

A clutch control apparatus for receiving an air flow more easily and to obtain a higher cooling performance in a power unit for a saddle-ride type vehicle while avoiding the size of the main engine body becoming larger in the front-and-rear direction. The power unit includes a clutch apparatus installed in a clutch chamber. The clutch apparatus is disposed in the course of power transmission from a crankshaft to a drive wheel. The clutch chamber is formed between a crankcase and a clutch cover that is coupled to a side surface of the crankcase. A clutch control apparatus that controls the switching of the connection and disconnection actions of a clutch apparatus is attached to the outer surface of a clutch cover in a position at a side of a cylinder block.

20 Claims, 15 Drawing Sheets

STRUCTURE FOR DISPOSING CLUTCH CONTROL APPARATUS IN POWER UNIT FOR SADDLE-RIDE TYPE VEHICLE

CROSS-REFERENCE TO RELATED APPLICATIONS

The present application claims priority under 35 USC 119 to Japanese Patent Application No. 2007-256957 filed on Sept. 29, 2007 the entire contents of which are hereby incorporated by reference.

BACKGROUND OF THE INVENTION

1. Field of the Invention

The present invention relates to a power unit for a saddle-ride type vehicle. In the power unit, a clutch apparatus is disposed in the course of power transmission between a crankshaft and a drive wheel for switching the connection and disconnection of the transmission of torque to the drive wheel from the crankshaft rotatably supported by a crankcase that forms a part of an engine main body. The clutch apparatus is installed in a clutch chamber formed between the crankcase and a clutch cover coupled to a side surface of the crankcase. The present invention, in particular, relates to an improved structure for disposing a clutch control apparatus.

2. Description of Background Art

Japanese Patent Application Publication No. Hei 11-222043 discloses a clutch control apparatus to control the switching of the connection and disconnection of the clutch apparatus. The disclosed clutch control apparatus is disposed in the rear part of the engine main body. In addition, Japanese Patent Application Publication No. 2006-117174 discloses a clutch control apparatus disposed on the seat rails of the vehicle-body frame that supports the engine main body.

The structure, such as one disclosed in Japanese Patent Application Publication No. Hei 11-222043 wherein the clutch control apparatus is disposed in the rear part of the engine main body, makes the engine main body longer in the front-and-rear direction. The structure of this type tends to result in a larger vehicle body length in the front-and-rear direction. The structure, such as one disclosed in Japanese Patent Application Publication No. 2006-117174 wherein the clutch control apparatus is disposed on the vehicle-body frame, can prevent the engine main body from having a larger total length in the front-and-rear direction. In the structure of this type, however, the clutch control apparatus has difficulty in receiving an air flow because the frame members and other component parts that exist around the clutch control apparatus block the air flow. More particularly in a case, such as Japanese Patent Application Publication No. 2006-117174, wherein the clutch control apparatus is disposed on the seat rails, the clutch control apparatus that is surrounded by the riding seat and the rear fender has more difficulty in receiving the air flow. Accordingly, the cooling-down of the clutch control apparatus becomes a problem.

SUMMARY AND OBJECTS OF THE INVENTION

The present invention is made in view of the above-described circumstances. Accordingly, an object of an embodiment of the present invention is to provide a structure for disposing a clutch control apparatus in a power unit for a saddle-ride type vehicle. The structure prevents the engine main body from becoming longer in the front-and-rear direction. At the same time, the structure allows the clutch control apparatus to receive the air flow more efficiently and thus achieve higher cooling performance for the clutch control apparatus.

For the purpose of achieving above-mentioned objects, an embodiment of the present invention provides a structure for disposing a clutch control apparatus in a power unit for a saddle-ride type vehicle. The structure of disposing a clutch control apparatus has the following characteristic features. A clutch apparatus is disposed in the course of power transmission from a crankshaft, which is rotatably supported by a crankcase that forms a part of an engine main body, to a drive wheel so as to connect and to disconnect the transmission of torque of the crankshaft to the drive wheel. The clutch chamber is formed between the crankcase and a clutch cover that is coupled to a side surface of the crankcase. The clutch apparatus is installed in a clutch chamber. A cylinder block, that also forms a part of the engine main body together with the crankcase, is coupled to the crankcase and includes a cylinder bore into which a piston linked to the crankshaft is slidably fitted. A clutch control apparatus that controls the switching of the connection and disconnection actions of the clutch apparatus is attached to the outer surface of the clutch cover in a position at a side of the cylinder block.

According to an embodiment of the present invention, the clutch apparatus is a twin-type clutch apparatus and includes first and second clutches. A pair of individual control means are provided respectively for the first and the second clutches for controlling the connection and disconnection of the first and the second clutches. The clutch control apparatus, including the two individual control means, is attached to the outer surface of the clutch cover while the two individual control means are disposed at different positions from each other both in the front-and-rear direction and in the up-and-down direction.

According to an embodiment of the present invention, the clutch cover includes a protruding portion that protrudes outwards to a side along the axial direction of the clutch apparatus. The clutch control apparatus is attached to the outer surface of the clutch cover in a position located closer to the center than the outermost end of the protruding portion.

According to an embodiment of the present invention, the clutch control apparatus is disposed at in a position farther to the center than the clutch apparatus when viewed along the axial direction of the clutch apparatus.

According to an embodiment of the present invention, a first one of the two individual control means is disposed above a second one of the two individual control means and above the crankshaft. The second one of the two individual control means is disposed in a position at the front of the crankshaft.

According to an embodiment of the present invention, oil channels that connect the hydraulic clutch apparatus to the clutch control apparatus controlling the hydraulic pressure applied to the clutch apparatus are formed in the clutch cover.

According to an embodiment of the present invention, the engine main body is a V-type engine and includes a front-side bank positioned on the front side of the engine main body that is in a state of being mounted on the vehicle and a rear-side bank disposed at the rear side of the front-side bank. The clutch control apparatus is disposed in a position at a side of the cylinder block located on the front-side bank side.

Note that a first electromagnetic control valve 235 and a second electromagnetic control valve 236 correspond to the individual control means of the present invention.

According to an embodiment of the present invention, the clutch control apparatus that controls the switching of the connection and disconnection actions of the clutch apparatus is attached to the outer surface of the clutch cover that is attached to any one of the right-hand and the left-hand side surfaces of the crankcase in a state where the engine main body is mounted on the vehicle. The clutch control apparatus thus attached is disposed in a position at a side of the cylinder block. For this reason, the clutch control apparatus receives the air flow more efficiently, and higher cooling performance for the clutch control apparatus can be expected. At the same time, the engine main body can be prevented from having a larger total length in the front-and-rear direction. Moreover, the component parts of the intake system and the component parts constituting the vehicle such as the vehicle-body frame are rarely disposed in the portion corresponding to the outer surface of the clutch cover. Accordingly, attaching the clutch control apparatus to the outer surface of the clutch cover allows a greater degree of freedom in design for the component parts of the intake system, the vehicle frame and the like.

According to an embodiment of the present invention, when the clutch apparatus is a twin-type clutch apparatus including first and second clutches, a pair of individual control means are provided respectively for the first and the second clutches so as to individually control the connection and disconnection of the first and the second clutches. The two individual control means are disposed at different positions from each other both in the front-and-rear direction and in the up-and-down direction. Accordingly, the two individual control means receive the travelling air more efficiently, and an excellent cooling performance for the individual control means can be obtained.

According to an embodiment of the present invention, the clutch control apparatus is disposed in a position at the inner to the vehicle than the outermost end of the clutch cover. For this reason, the protrusion of the clutch control apparatus to any one of the right-hand and left-hand sides of the crankcase can be reduced to the minimum. Accordingly, the disposition of the clutch control apparatus is no longer a concern for the bank angle.

According to an embodiment of the present invention, the clutch control apparatus is disposed in a position farther to the center than the clutch apparatus when viewed along the axial direction of the clutch apparatus. Thus, the clutch control apparatus can be attached to the outer surface of the clutch cover while avoiding the clutch apparatus that protrudes most, from the crankcase, towards any one of the right-hand and left-hand sides. Accordingly, the power unit can be prevented, as much as possible, from becoming larger in size in the right-and-left direction.

According to an embodiment of the present invention, a first one of the two individual control means is disposed above a second one of the two individual control means and above the crankshaft while at least a part of the second one of the two individual control means is disposed at the front side of the crankshaft. In this configuration, the clutch control apparatus is disposed in a space above the crankshaft to a portion in front of the crankshaft which is relatively large compared to the space between the crankshaft and the crutch apparatus. Accordingly, the crankshaft and the clutch apparatus can be disposed with a narrower distance between axis of the crankshaft and the axis of the clutch apparatus. In addition, the first and the second individual control means can receive the air flow more efficiently.

According to an embodiment of the present invention, both the clutch control apparatus that control the hydraulic pressure applied to the hydraulic clutch apparatus and the oil channels that connect the clutch apparatus to the clutch control apparatus are disposed in the clutch cover in an aggregated manner. Thus, the oil channels can be shortened and simplified. In addition, the maintenance work for the mechanism that controls the clutch apparatus can be made easier.

According to an embodiment of the present invention, while the engine main body is a V-type engine including a front-side bank and a rear-side bank, the clutch control apparatus is disposed, on the front-side bank side, at a side of the cylinder block. Thus, the clutch control apparatus can receive the air flow more efficiently, and a higher cooling performance for the clutch control apparatus can be expected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode of carrying out the present invention will be described below. The descriptions will be based on an embodiment of the present invention. The embodiment will be described with reference to accompanying drawings.

Figure 1:
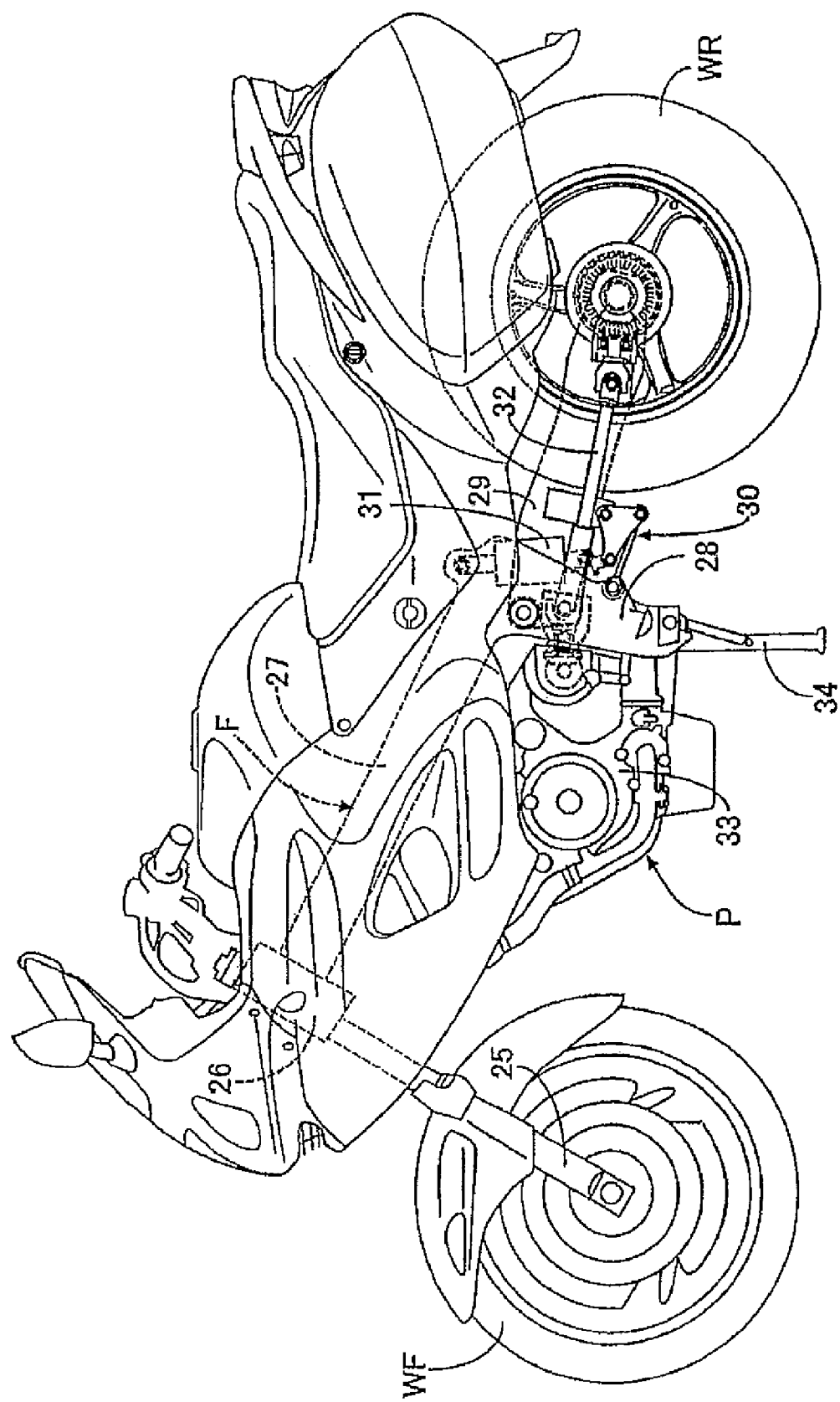
FIG. 1 is a left-hand side view of a motorcycle.

FIGS. 1 to 15 illustrate an embodiment of the present invention. Referring to FIG. 1, a vehicle-body frame F of a motorcycle—a saddle-ride type vehicle—includes a head pipe 26, a right-and-left pair of main frames 27, a right and left pair of pivot plates 28. The head pipe 26 rotatably supports a steerable front fork 25. The front fork 25 pivotally supports a front wheel WF. The main frames 27 extend from the head pipe 26 downwards to the rear. The pivot plates 28, which extend downwards, are provided contiguously from the rear end of respective main frames 27. A swing arm 29, which is swingably supported at its front end by the pivot plates 28, pivotally supports a rear wheel WR at its rear portion. In addition, a linkage 30 is disposed between the lower portions of the pivot plates 28 and the front portion of the swing arm 29. Moreover, a cushion unit 31 is disposed between the upper portions of the pivot plates 28 and the linkage 30.

A power unit P, which is composed of an engine E and a transmission M, is suspended from the main frames 27 and the pivot plates 28. The torque outputted from the transmission M of the power unit P is transmitted to the rear wheel WR by means of a drive shaft 32, which extends in the front-and-rear direction.

A side stand 34 is attached either to an engine main body 33 of the engine E or to the vehicle-body frame F. In this embodiment, the side stand 34 is attached to the lower portion of the left-hand side pivot plate 28 of the vehicle-body frame F. Accordingly, when the motorcycle is parked with the side stand 34 being in the down position, the motorcycle leans leftwards.

Figure 2:
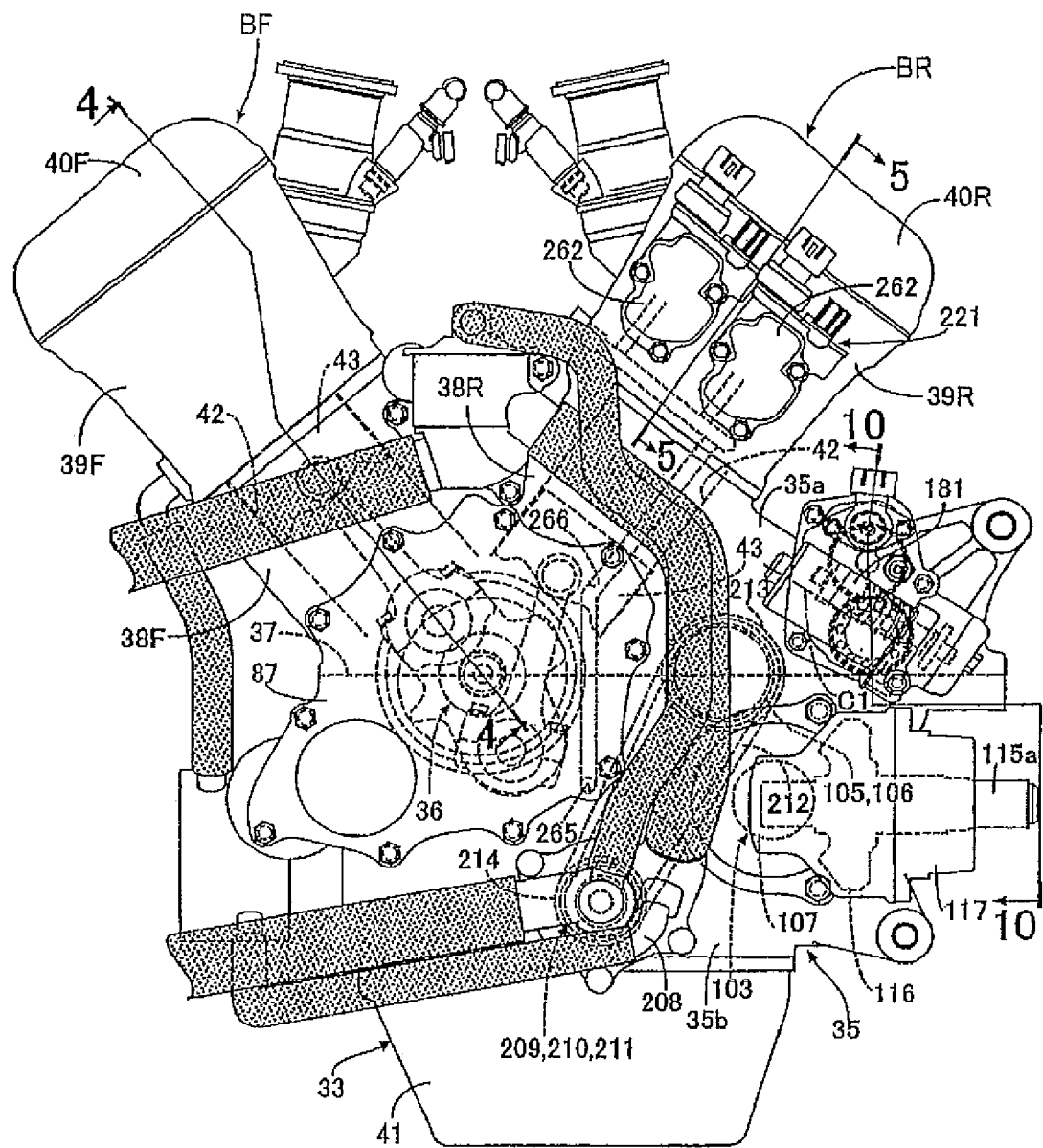
FIG. 2 is a left-hand side view of a power unit.
Figure 3:
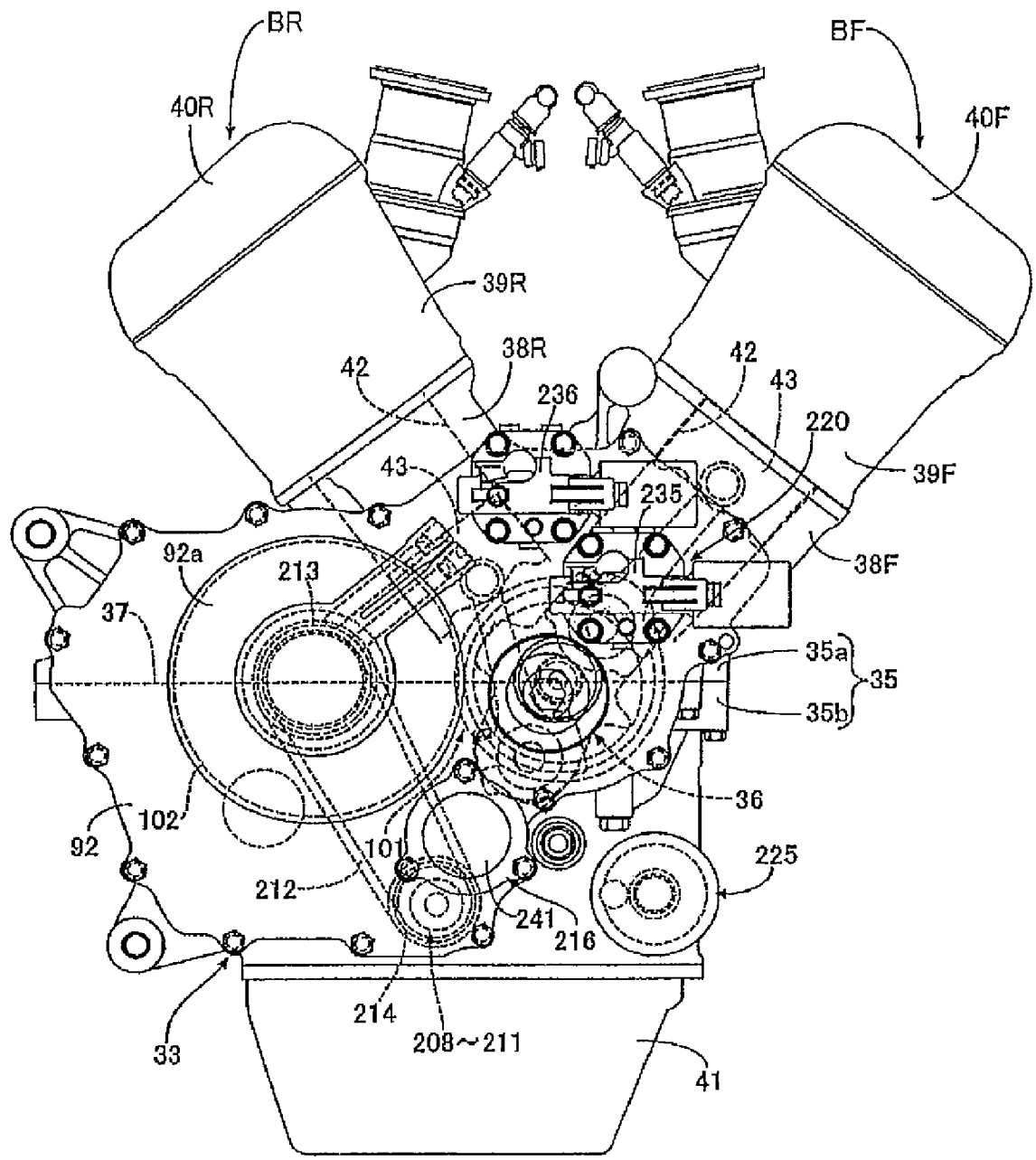
FIG. 3 is a right-hand side view of a power unit.

In FIGS. 2 and 3, the engine main body 33 of the engine E is a V-type water-cooled engine. The engine main body 33 includes a front-side bank BF, which is positioned on the front side when the engine E is mounted on the motorcycle and a rear-side bank BR, which is located at the rear of the front-side bank BF. A crankcase 35 for both of the banks BF and BR supports a rotatable crankshaft 36, which extends in the right-and-left direction of the motorcycle.

The crankcase 35 is composed of an upper case half 35a and a lower case half 35b, which are coupled together. A front-side cylinder block 38F and a rear-side cylinder block 38R, which form a V-shape, are formed integrally in the upper case half 35a. The axis of the crankshaft 36 is positioned on a coupling plane 37 of the upper and the lower case halves 35a and 35b.

The front-side bank BF is composed of the front-side cylinder block 38F, a front-side cylinder head 39F coupled to the front-side cylinder block 38F, and a front-side head cover 40F coupled to the front-side cylinder head 39F. The rear-side bank BR, on the other hand, is composed of the rear-side cylinder block 38R, a rear-side cylinder head 39R coupled to the rear-side cylinder block 38R, and a rear-side head cover 40R coupled to the rear-side cylinder head 39R. In addition, an oil pan 41 is coupled to the bottom side of the crankcase 35.

Two cylinder bores 42, which are arranged side by side in the axial direction of the crankshaft 36, are formed in the front-side cylinder block 38F, which is coupled to the crankcase 35. Suspending the engine main body 3 from the vehicle-body frame F directs the axes of the cylinder bores 42 to be obliquely upwards to the front. Likewise, two cylinder bores 42, which are arranged side by side in the axial direction of the crankshaft 36, are formed in the rear-side cylinder block 38R, which is coupled to the crankcase 35. Suspending the engine main body 3 from the vehicle-body frame F directs the axes of the cylinder bores 42 to be obliquely upwards to the rear. Accordingly, pistons 43 that are slidably fitted into the respective ones of the two cylinder bores 42 of the front-side bank BF and pistons 43 that are slidably fitted into the respective ones of the two cylinder bores 42 of the rear-side bank BR are linked to the common crankshaft 36.

Figure 4:
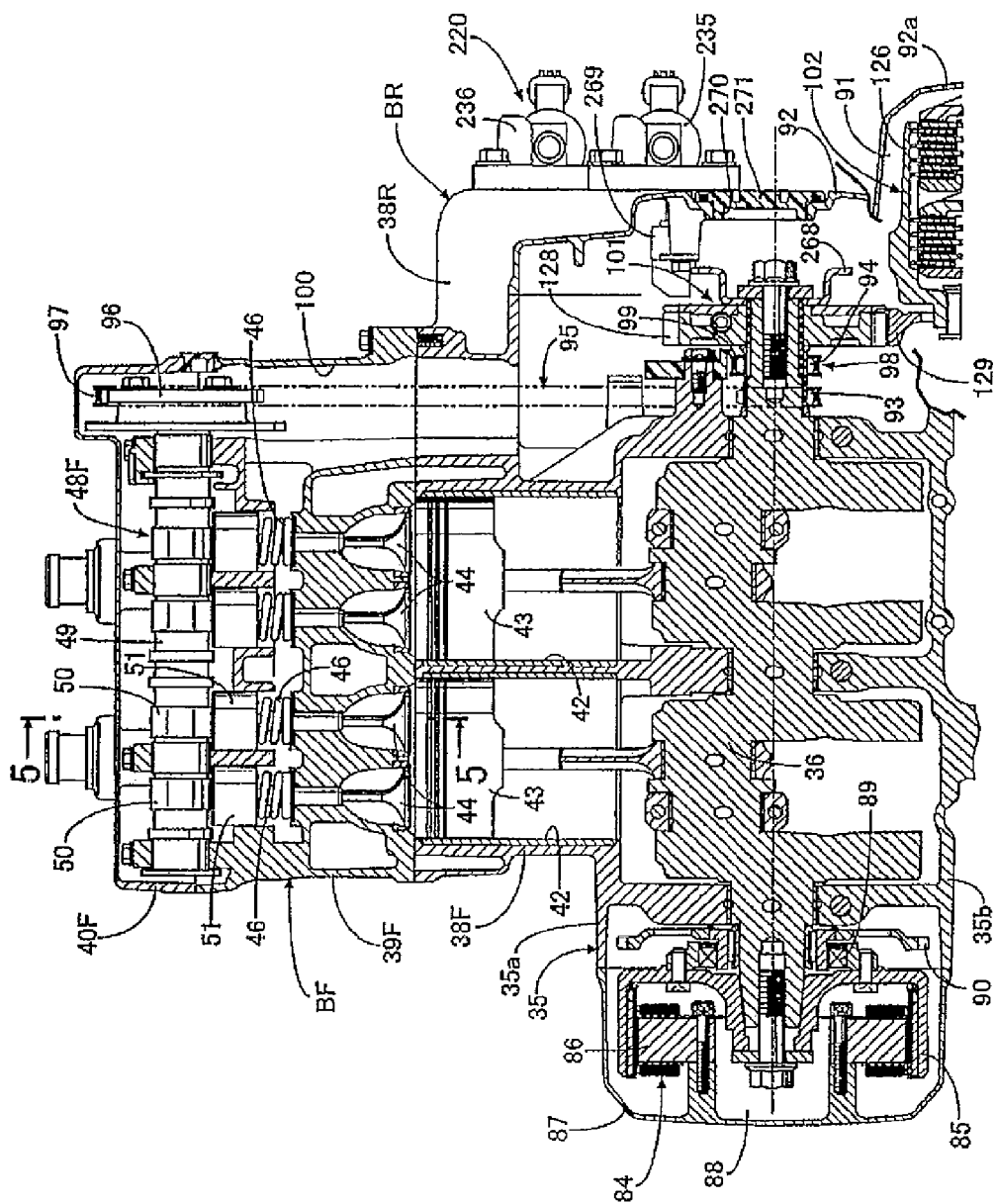
FIG. 4 is a sectional view taken along the line 4-4 of FIG. 2.
Figure 5:
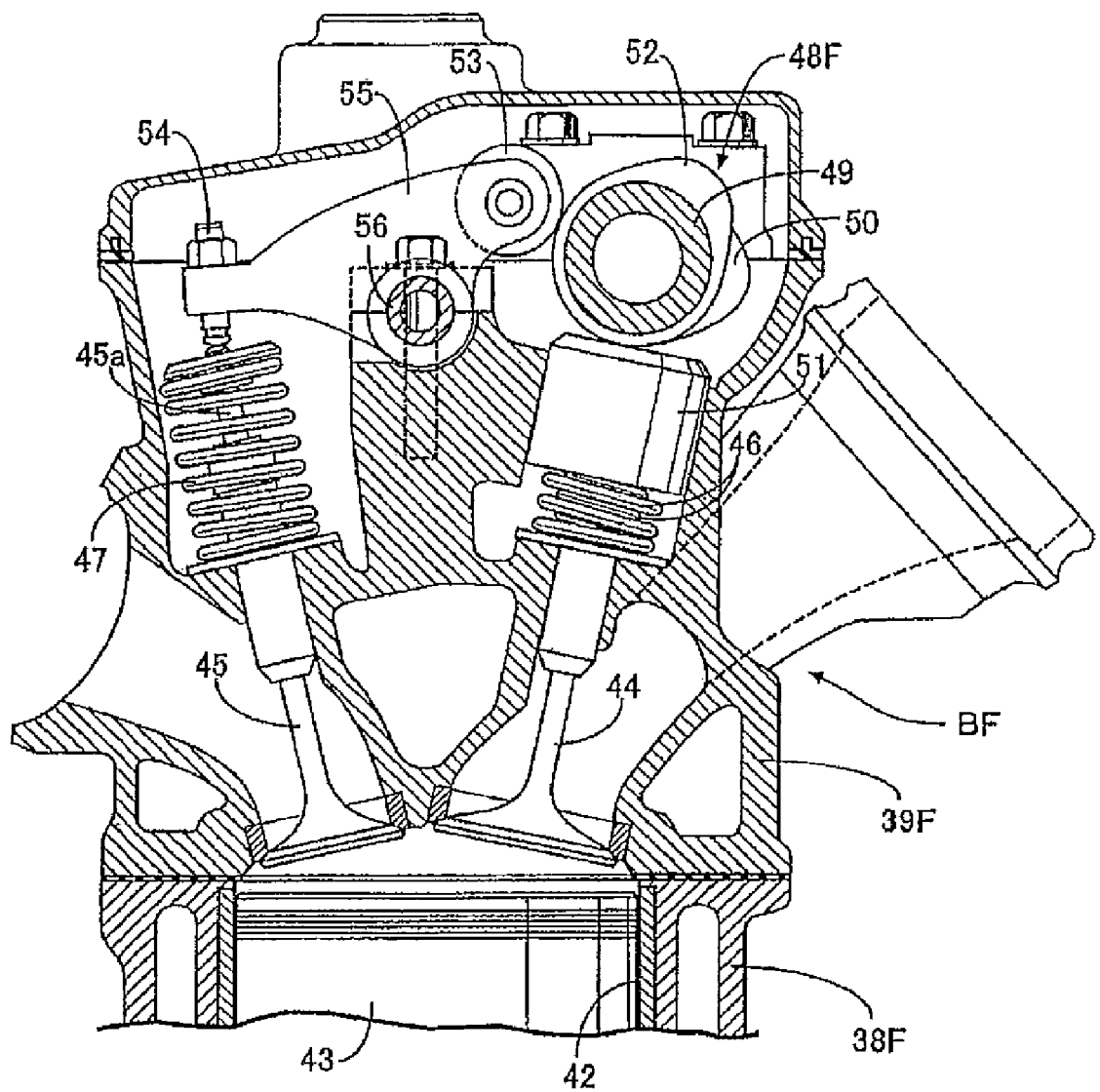
FIG. 5 is a sectional view taken along the line 5-5 of FIG. 4.

Referring to FIGS. 4 and 5, in the front-side cylinder head 39F, a pair of inlet valves 44, which are allowed the opening and closing action, are disposed for each of the cylinder bores 42. A pair of valve springs 46 are provided to bias the respective inlet valves 44 toward the valve-closing direction. In addition, a pair of exhaust valves 45, which are allowed the opening and closing action, are disposed for each of the cylinder bores 42. A pair of valve springs 47 are provided to bias the respective exhaust valves 45 toward the valve-closing direction. The inlet valves 44 and the exhaust valves 45 are driven to open and close by a front-side bank valve-lifting apparatus 48F.

The front-side bank valve-lifting apparatus 48F includes a camshaft 49, inlet-side valve lifters 51, and rocker arms 55. The camshaft 49 with its axis arranged in parallel to the crankshaft 36 is rotatably supported by the front-side cylinder head 39F, and is disposed above the inlet valves 44. The inlet-side valve lifters 51 are installed between the inlet valves 44 and a plurality of (specifically, four in this embodiment) inlet-side cams 50 formed on the camshaft 49, and are slidably fitted into the front-side cylinder head 39F. Each of the rocker arms 55 has a roller 53 at its first end. The rollers 53 are in contact with and roll on their respective ones of a plurality of (specifically, four in this embodiment) exhaust-side cams 52 formed on the camshaft 49. Each of the rocker arms 55 has a tappet screw 54 screwed in a position at its second end while the position of each tappet screw 54 is made adjustable, that is, each tappet screw is capable of either advancing or retreating. The tappet screws 54 abut on the respective upper ends of the stems 45a of the exhaust valves 45. A rocker shaft 56 is provided to support, swingably, the rocker alms 55. The rocker shaft 56 is disposed in and fixed to the front-side cylinder head 39F with its axis arranged in parallel to the camshaft 49.

Figure 6:
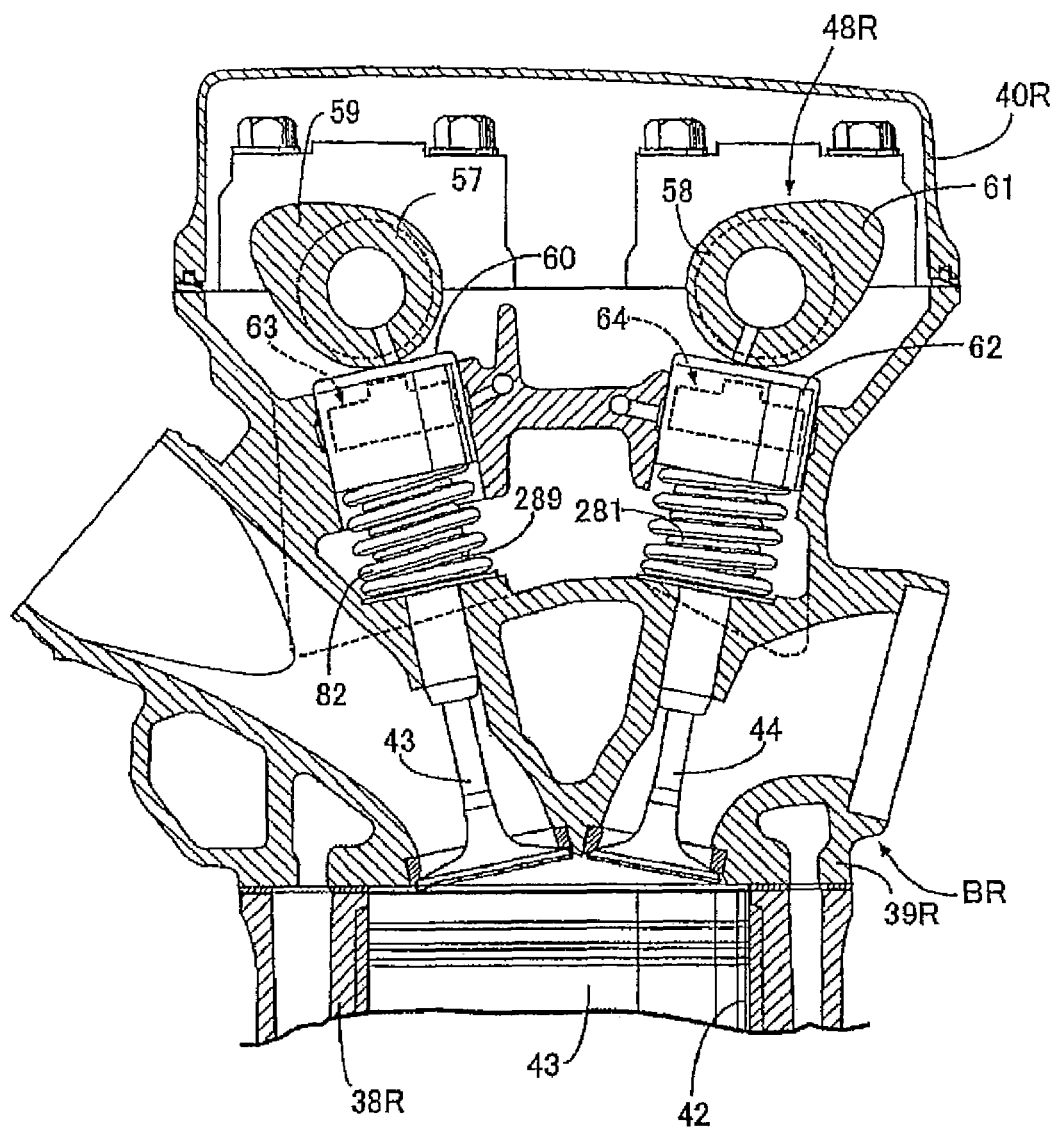
FIG. 6 is a sectional view of the rear-side bank side corresponding to FIG. 5.

Referring to FIG. 6, in the rear-side cylinder head 39R, a pair of inlet valves 43 and a pair of exhaust valves 44, which are allowed the opening and closing action, are disposed for each of the cylinder bores 42. A pair of valve springs 280 and a pair of valve springs 281 are provided to bias the respective inlet valves 43 and exhaust valves 44 toward the valve-closing direction. The inlet valves 43 and the exhaust valves 44 are driven to open and close by a rear-side bank valve-lifting apparatus 48R.

The rear-side bank valve-lifting apparatus 48R includes an inlet-side camshaft 57, an exhaust-side camshaft 58, inlet-side valve lifters 60, and exhaust-side valve lifters 62. The inlet-side camshaft 57 with its axis arranged in parallel to the crankshaft 36 is rotatably supported by the rear-side cylinder head 39R, and is disposed above the inlet valves 43. The exhaust-side camshaft 58 with its axis arranged in parallel to the crankshaft 36 is rotatably supported by the rear-side cylinder head 39R, and is disposed above the exhaust valves 44 . . . . The inlet-side valve lifters 60 are installed between the inlet valves 43 and a plurality of (specifically, four in this embodiment) inlet-side cams 59 formed on the inlet-side camshaft 57, and are slidably fitted into the rear-side cylinder head 39R. The exhaust-side valve lifters 62 are installed between the exhaust valves 44 and a plurality of (specifically, four in this embodiment) exhaust-side cams 61 formed on the exhaust-side camshaft 58, and are slidably fitted into the rear-side cylinder head 39R.

In addition, an inlet-side valve-action-status changing mechanism 63 and an exhaust-side valve-action-status changing mechanism 64 are annexed to the rear-side bank valve-lifting apparatus 48R. The inlet-side valve-action-status changing mechanism 63 allows the action status of the inlet valves 43 for the two cylinders of the rear-side bank BR to be switched between a state in which the opening and closing action of the inlet valves 43 is allowed and a state in which the inlet valves 43 are closed and their action is temporarily halted. The exhaust-side valve-action-status changing mechanism 64 allows the action status of the exhaust valves 44 for the two cylinders of the rear-side bank BR to be switched between a state in which the opening and closing action of the exhaust valves 44 is allowed and a state in which the exhaust valves 44 are closed and their action is temporarily halted.

Figure 7:
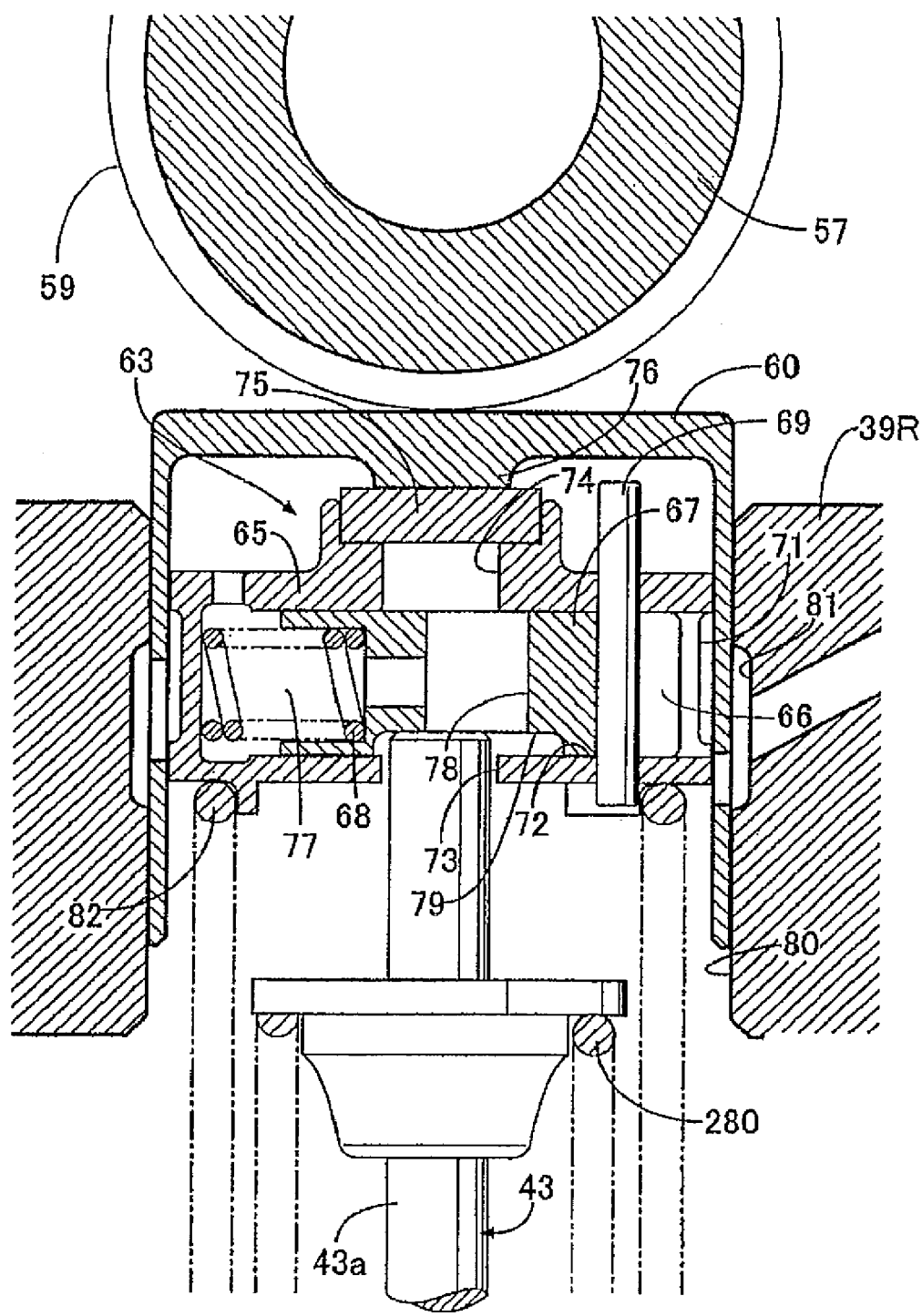
FIG. 7 is an enlarged sectional view of a principal portion of FIG. 6.

Referring to FIG. 7, the inlet-side valve-action-status changing mechanism 63 is involved in the action of the inlet-side valve lifters 60. The inlet-side valve-action-status changing mechanism 63 includes a pin holder 65, a slide pin 67, a return spring 68, and a stopper pin 69. The pin holder 65 is slidably fitted into the inlet-side valve lifter 60. The slide pin 67 is slidably fitted into the pin holder 65 while a hydraulic chamber 66 is formed between the internal surface of the inlet-side valve lifter 60 and the slide pin 67. The return spring 68 is disposed between the slide pin 67 and the pin holder 65, and the spring force of the return spring 68 biases the slide pin 67 toward a direction so that the capacity of the hydraulic chamber 66 is reduced. The stopper pin 69 is disposed between the pin holder 65 and the slide pin 67, and blocks the rotation about the axis of the slide pin 67.

A ring-shaped groove 71 is formed in the outer circumference of the pin holder 65. A bottomed slide hole 72 is formed in the pin holder. The axis of the slide hole 72 is orthogonal to the axis of the inlet-side valve lifter 60. A first end of the slide hole 72 is an opening to the ring-shaped groove 71 while a second end of the slide hole 72 is closed. An insertion hole 73 and an extension hole 74 are coaxially formed in the pin holder 65. A forward-end portion of a stem 43a of the inlet valve 43 is inserted into the insertion hole 73 when the inlet valve 43 is biased toward a valve-closing direction by the valve spring 280. The extension hole 74 is formed at a position such that the slide hole 72 is located between the extension hole 74 and the insertion hole 73. The extension hole 74 thus formed is capable of accepting the forward-end portion of the stem 43a of the inlet valve 43. A disc-shaped shim 75 is fitted into the pin holder 65 so as to close the end of the extension hole 74 that is located at the closed-end side of the inlet-side valve lifter 60. A protrusion 76 that is in contact with the shim 75 is formed integrally with the inlet-side valve lifter 60 at the center of the inner surface of the closed end of the inlet-side valve lifter 60.

The slide pin 67 is slidably fitted into the slide hole 72 formed in the pin holder 65. The hydraulic chamber 66, which leads to the ring-shaped groove 71, is formed between a first end of the slide pin 67 and the inner surface of the inlet-side valve lifter 60. A spring chamber 77 is formed between a second end of the slide pin 67 and the closed end of the slide hole 72, and the return spring 68 is set in the spring chamber 77.

In the slide pin 67, a housing hole 78 is formed at the center in the axial direction of the slide pin 67. The housing hole 78 is coaxially contiguous, when necessary, both to the insertion hole 73 and to the extension hole 74, and thus is capable of accepting the forward-end portion of the stem 43a. A flat contact face 79 is formed in the bottom outside surface of the slide pin 67 so as to face the insertion hole 73. An end portion of the housing hole 78 of the insertion hole 73 side is formed in the contact face 79. Here, the contact face 79 has a shape that has a relatively long side along the axial direction of the slide pin 67, and the opening of the housing hole 78 is formed, within the contact face 79, in a portion located on a side that is closer to the hydraulic chamber 66.

The slide pin 67 slides in the axial direction thereof in accordance with the equilibrium between the hydraulic force acting on the first end side of the slide pin 67 by the hydraulic pressure of the hydraulic chamber 66 and the spring force acting on the second end side of the slide pin 67 by the return spring 68. When the hydraulic pressure of the hydraulic chamber 66 is low, that is, when the hydraulic chamber 66 is not in operation, the slide pin 67 moves to the right-hand side in FIG. 7. Accordingly, the housing hole 78 is displaced from the common axis of the insertion hole 73 and of the extension hole 74, and, as a consequence, the forward end of the stem 43a abuts on the contact face 79. Conversely, when the hydraulic pressure of the hydraulic chamber 66 is high, that is, the hydraulic chamber 66 is in operation, the slide pin 67 moves to the left-hand side in FIG. 7. Accordingly, the housing hole 78 and the extension hole 74 accept the forward-end portion of the stem 43a inserted from the insertion hole 73.

Now, assume that the slide pin 67 moves to a position such that the housing hole 78 becomes coaxially contiguous both to the insertion hole 73 and to the extension hole 74. At this time, in response to the sliding movement of the inlet-side valve lifter 60 caused by the pressing force exerted by the inlet-side cam 59, both the pin holder 65 and the slide pin 67 move to the inlet valve 43 side along with the inlet-side valve lifter 60. The forward-end portion of the stem 43a is accepted by the housing hole 78 and by the extension hole 74 at this time. Thus, the inlet-side valve lifter 60 and the pin holder 65 exert no pressing force to the valve-opening direction on the inlet valve 43. As a consequence, the inlet valve 43 remains in state of shutdown. Conversely, assume that the slide pin 67 moves to a position such that the forward end of the stem 43a abuts on the contact face 79. At this time, in response to the sliding movement of the inlet-side valve lifter 60 caused by the pressing force exerted by the inlet-side cam 59, both the pin holder 65 and the slide pin 67 move to the inlet valve 43 side. Along with the above-mentioned movement of the pin holder 65 and the slide pin 67, a pressing force to the valve-opening direction acts on the inlet valve 43. As a consequence, the inlet valve 43 takes an opening and closing action in accordance with the rotation of the inlet-side cam 59.

Support holes 80 are formed in the rear-side cylinder head 39R. The inlet-side valve lifters 60 are fitted into and are slidably supported by the support holes 80, respectively. Ring-shaped recessed portions 81 are formed respectively in the inner surfaces of the support holes 80. Each ring-shaped recessed portion 81 surrounds the corresponding one of the inlet-side valve lifters 60, and is always communicatively connected to each of the ring-shaped groove 71 of the pin holder 65 even though the inlet-side valve lifter 60 slides within the support hole 80. A spring 82 is set in the interstice between the corresponding one of the inlet-side valve lifters 60 and the rear-side cylinder head 39R. The spring 82 biases the inlet-side valve lifter 60 toward a direction such that the inlet-side valve lifter 60 abuts on the inlet-side cam 59.

The exhaust-side valve-action-status changing mechanism 64 has a configuration that is similar to that of the inlet-side valve-action-status changing mechanism 63, and is involved in the action of the exhaust-side valve lifters 62. The exhaust-side valve-action-status changing mechanism 64 is capable of switching between a state where the exhaust valve 44 is closed and temporarily shutdown when high hydraulic pressure is applied and a state where the exhaust valve takes an opening and closing action when low hydraulic pressure is applied.

As described above, the rear-side bank valve-lifting apparatus 48R controls the action of the inlet-side valve-action-status changing mechanisms 63 and the action of the exhaust-side valve-action-status changing mechanisms 64. By means of such a control, the rear-side bank valve-lifting apparatus 48R can switch between a state where the inlet valves 43 and the exhaust valves 44 for the two cylinders in the rear-side bank BR take opening and closing action and a state where the inlet valves 43 and the exhaust valves 44 for the two cylinders in the rear-side bank BR are closed and temporarily shutdown, that is, the cylinders are temporarily shutdown.

Referring back to FIG. 4, suppose that the engine main body 33 is mounted on the vehicle-body frame F. In this state, an alternator 84 is connected to the left-hand end portion of the crankshaft 36. The alternator 84 includes a rotor 85, which is fixed to the crankshaft 36. The alternator 84 also includes a stator 86, which fixed in a position inside the rotor 85. The alternator 84 is set in an alternator housing 88 formed by the crankcase 35 and an alternator cover 87 that is coupled to the left-hand side surface of the crankcase 35. The stator 86 is fixed to the alternator cover 87.

A gear 90 is connected to the rotor 85 via a one-way clutch 89. The one way clutch 89 allows the power transmission to the rotor 85. To the gear 90, power is transmitted from a starter motor, which is not illustrated.

Now, suppose again that the engine main body 33 is mounted on the vehicle-body frame F. In this state, a clutch cover 92 is coupled to the right-hand side surface of the crankcase 35. A clutch chamber 91 is thus formed between the crankcase 35 and the clutch cover 92. Inside the clutch chamber 91, drive sprockets 93 and 94 are fixed on the crankshaft 36. Of the two sprockets, the drive sprocket 93 forms a part of a front-side bank timing transmission mechanism 95, which transmits the torque of the crankshaft 36 to the camshaft 49 of the front-side bank valve-lifting apparatus 48F with a reduction ratio of 1:2. The front-side bank timing transmission mechanism 95 is composed of the drive sprocket 93, a driven sprocket 96 fixed on the camshaft 49, and an endless cam chain 97 looped around the drive and the driven sprockets 93 and 96. The drive sprocket 94, on the other hand, forms a part of a rear-side bank timing transmission mechanism 98, which transmits the torque of the crankshaft 36 to the inlet-side and the exhaust-side camshafts 57 and 58 of the rear-side bank valve-lifting apparatus 48R with a reduction ratio of 1:2. The rear-side bank timing transmission mechanism 98 is composed of the drive sprocket 94, driven sprockets, which are not illustrated, fixed respectively on the inlet-side and the exhaust-side camshafts 57 and 58 and an endless cam chain 99 looped around the drive sprocket 94 and the driven sprockets.

A cam-chain chamber 100 is formed in the front-side cylinder block 38F and in the front-side cylinder head 39F. The cam chain 97 runs inside the cam-chain chamber 100. Another cam-chain chamber, which is not illustrated, is formed in the rear-side cylinder block 38R and in the rear-side cylinder head 39R. The cam chain 99 runs inside this unillustrated cam-chain chamber.

The power is transmitted from the crankshaft 36 to the rear wheel WR via a route including a primary reduction apparatus 101, a clutch apparatus 102, a gear transmission mechanism 103, and a drive shaft 32. In the route, the power is transmitted through these portions in the order enlisted above from the crankshaft 36 side. The primary reduction apparatus 101 and the clutch apparatus 102 are installed in the clutch chamber 91 while the gear transmission mechanism 103 is installed in the crankcase 35.

Figure 8:
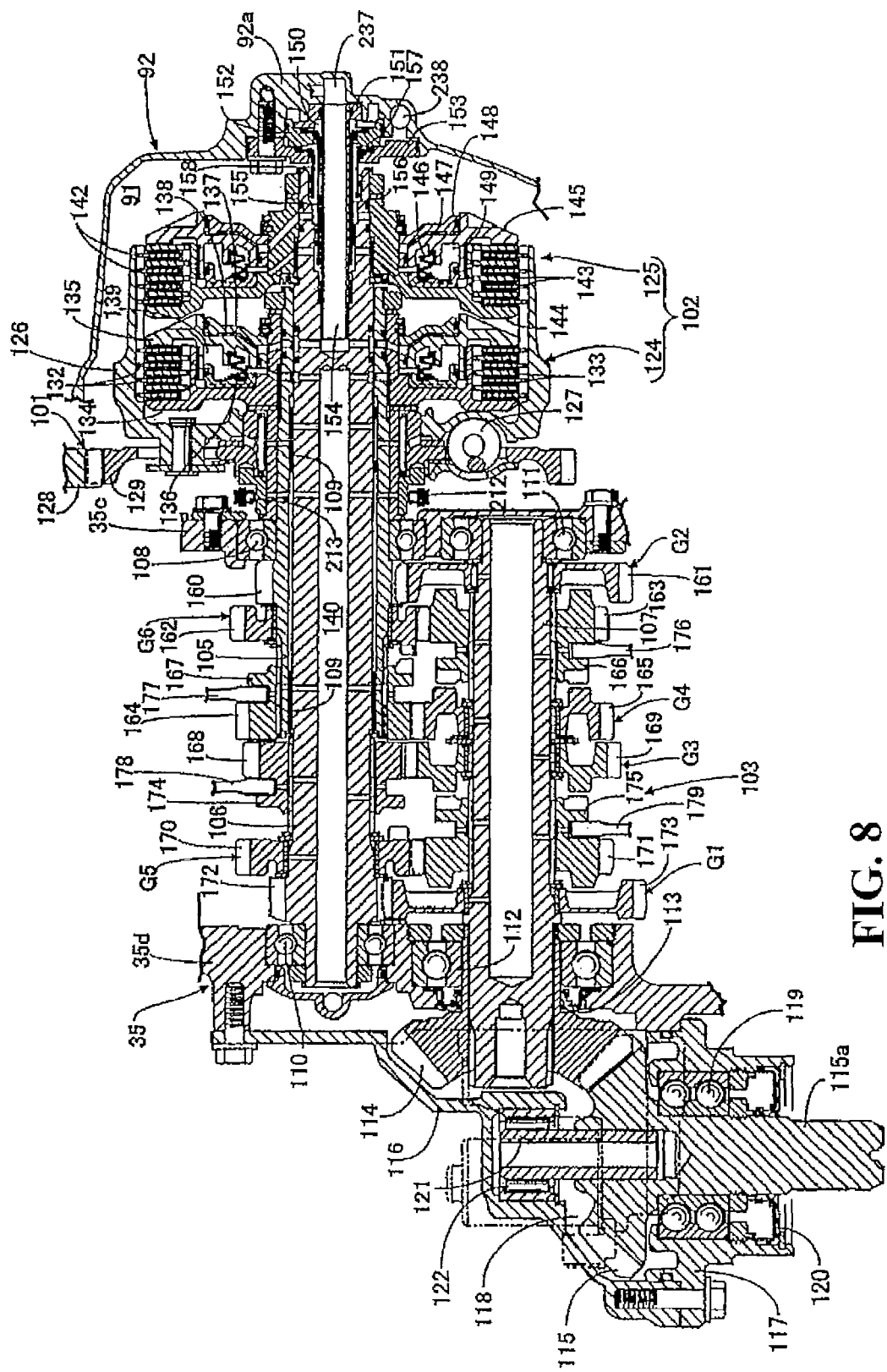
FIG. 8 is a longitudinal sectional view of a gear transmission mechanism and a clutch apparatus.

Now, refer also to FIG. 8. The gear transmission mechanism 103, which is installed in the crankcase 35, includes selectable plural speed gear trains, such as a first-speed to a sixth-speed gear trains G1, G2, G3, G4, G5, and G6. The second-speed, the fourth-speed, and the sixth-speed gear trains G2, G4, and G6 are disposed between a first main shaft 105 and a counter shaft 107. The first-speed, the third-speed, and the fifth-speed gear trains G1, G3, and 65 are disposed between the counter shaft 107 and a second main shaft 106, which coaxially penetrates the first main shaft 105 and which is capable of rotating independently of the first main shaft 105.

The crankcase 35 includes a pair of sidewalls 35c and 35d. The sidewalls 35c and 35d are arranged along the axial direction of the crankshaft 36, and face each other with a space in between. The middle portion of the first main shaft 105, which is formed in a cylindrical shape and which has its axis arranged in parallel to the crankshaft 36, rotatably penetrates the sidewall 35c. A ball bearing 108 is set between the sidewall 35c and the first main shaft 105. The second main shaft 106, which has its axis arranged in parallel to the crankshaft 36, penetrates the first main shaft 105. While the relative position, along the axial direction of the second main shaft 106 to the first main shaft 105, is fixed, the second main shaft 106 is allowed to rotate independently of the first main shaft 105. Plural needle bearings 109 are set between the first main shaft 105 and the second main shaft 106. One of the end portions of the second main shaft 106 is rotatably supported by the sidewall 35d of the crankcase 35 with a ball bearing 110 set in between.

The counter shaft 107 has its axis arranged in parallel to the crankshaft 36. A first end portion of the counter shaft 107 is rotatably supported by the sidewall 35c with a ball bearing 111 set in between. A second end portion of the counter shaft 107 rotatably penetrates the sidewall 35d while a ball bearing 112 and a ring-shaped sealing member 113 are set between the counter shaft 107 and the sidewall 35d. A portion of the counter shaft 107 sticks out of the sidewall 35d, and a drive bevel gear 114 is fixed onto the sticking-out end portion. The drive bevel gear 114 meshes with a driven bevel gear 115, which has a rotational axis extending in the front-and-rear direction of the motorcycle.

A gear chamber 118 is formed by a first gear cover 116, a second gear cover 117 and the sidewall 35d. The first gear cover 116 is detachably coupled to the sidewall 35d of the crank case 35 while a part of the sidewall 35d is covered with the first gear cover 116. The second gear cover 117 is detachably coupled to the first gear cover 116. In the gear chamber 118, the drive bevel gear 114 and the driven bevel gear 115 mesh with each other. The driven bevel gear 115 has a shaft portion 115a, which is formed coaxially with the driven bevel gear 115. The shaft portion 115a rotatably penetrates the second gear cover 117. A ball bearing 119 and a ring-shaped sealing member 120, which is placed at the outer side of the ball bearing 119, are set between the shaft portion 115a and the second gear cover 117. In addition, a first end portion of a support shaft 121 is fitted into the driven bevel gear 115 while a second end portion of the support shaft 121 is rotatably supported by the first gear cover 116 with roller bearing 122 in between. Moreover, the shaft portion 115a is connected to the drive shaft 32.

Figure 9:
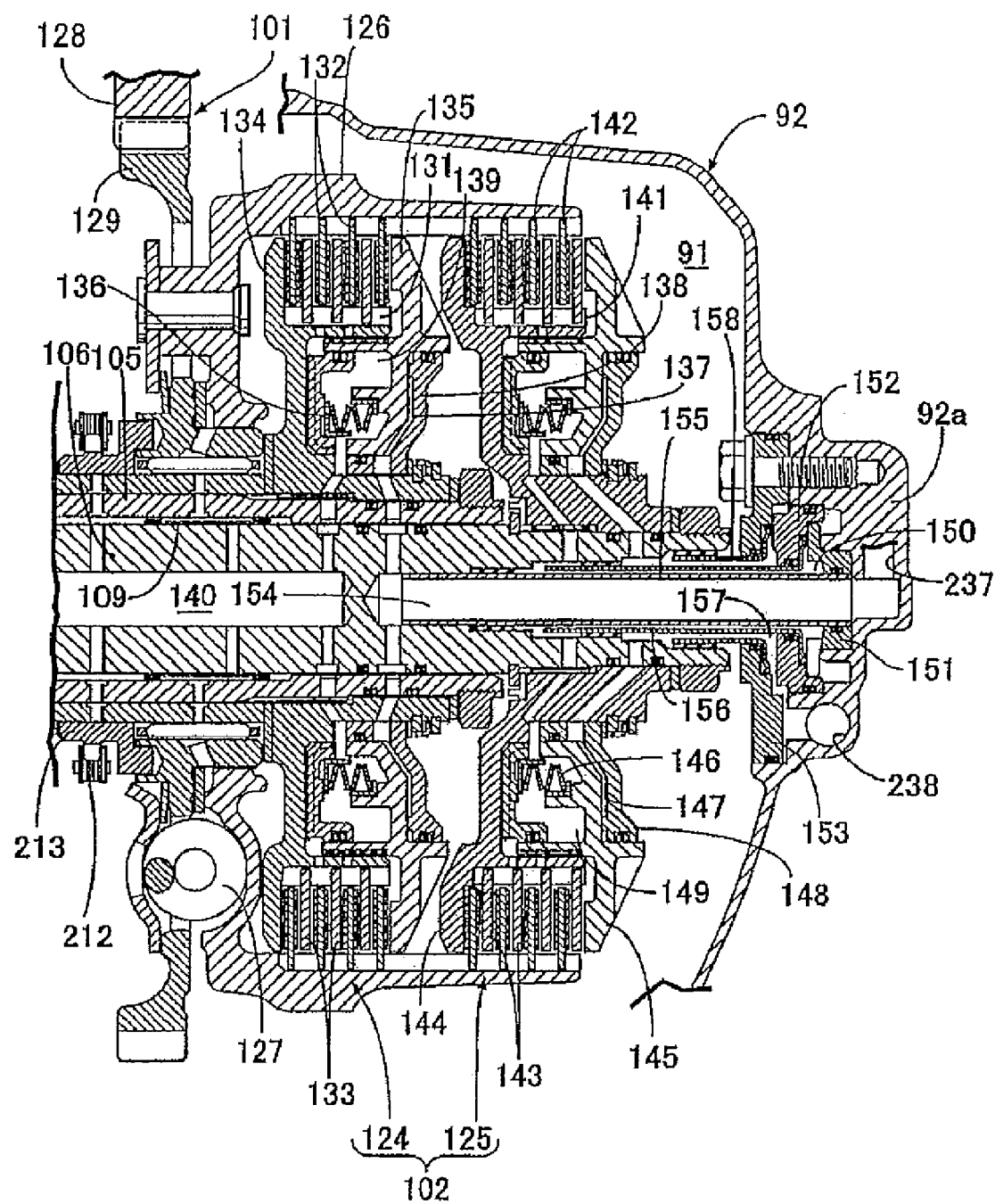
FIG. 9 is an enlarged view of a principal portion of FIG. 8.

Referring also to FIG. 9, the clutch apparatus 102 is a twin-type clutch apparatus with first and second clutches 124 and 125 disposed between the gear transmission mechanism 103 and the crankshaft 36. The first clutch 124 is disposed between the first end portion of the crankshaft 36 and the first end portion of the first main shaft 105 while the second clutch 125 is disposed between the first end portion of the crankshaft 36 and the first end portion of the second main shaft 106. The power from the crankshaft 36 is inputted into a clutch outer 126, which is shared by the first and the second clutches 124 and 125, via the primary reduction apparatus 101 and a damper spring 127.

The primary reduction apparatus 101 includes a drive gear 128 and a driven gear 129. The drive gear 128 is disposed on the crankshaft 36 in a position farther from the center than the drive sprocket 94. The driven gear 129, which meshes with the drive gear 128, is supported by the first main shaft 105, and is allowed to rotate independently of the first main shaft 105. The driven gear 129 is coupled to the clutch outer 126 with the damper spring 127 set in between.

A pulsar 268 is attached on a shaft end of the crankshaft 36 in a position farther from the center than the primary reduction apparatus 101. A rotation detector 269 is attached on the inner surface of the clutch cover 92. The rotation detector 269 detects the rotation speed of the crankshaft 36 by detecting the pulsar 268. An inspection hole 270 is formed in the clutch cover 92 for the purpose of inspecting the pulsar 268. To make the diameter of the inspection hole 270 as small as possible, the inspection hole 270 is formed, in the clutch cover 92, eccentrically from the axis of the crankshaft 36. In addition, the inspection hole 270 is closed by use of a detachable lid member 271.

The first clutch 124 includes the clutch outer 126, a first clutch inner 131, a plurality of first frictional plates 132, a plurality of second frictional plates 133, a first pressure receiving plate 134, a first piston 135, and a first spring 136. The first clutch inner 131 is coaxially surrounded by the clutch outer 126. In addition, the first clutch inner 131 is coupled onto the first main shaft 105, and is not allowed to rotate independently of the first main shaft 105. The first frictional plates 132 engage with the clutch outer 126, and are not allowed to rotate independently of the clutch outer 126. The second frictional plates 133 engage with the first clutch inner 131, and are not allowed to rotate independently of the first clutch inner 131. The second frictional plates 133 are alternately laid over the first frictional plates 132. The first pressure receiving plate 134 is disposed on the first clutch inner 131 so as to face the first and the second frictional plates 132 and 133, which are alternately laid over one another. The first piston 135 presses the first and the second frictional plates 132 and 133 against the first pressure receiving plate 134. The first spring 136 biases the first piston 135.

An end-wall member 138 is fixedly disposed on the first clutch inner 131, so that a first hydraulic chamber 137 that faces the back face of the first piston 135 is formed between the end-wall member 138 and the first piston 135. In response to the increase in the hydraulic pressure of the first hydraulic chamber 137, the first piston 135 presses the first and the second frictional plates 132 and 133 against the first pressure receiving plate 134. As a consequence, the first clutch 124 becomes the connected state, in which the power transmitted from the crankshaft 36 to the clutch outer 126 is transmitted to the first main shaft 105. In addition, a canceller chamber 139 is formed between the first clutch inner 131 and the first piston 135 so as to face the front face of the first piston 135. The first spring 136 is set in the canceller chamber 139, and exerts the spring force to the direction which reduces the capacity of the first hydraulic chamber 137.

The canceller chamber 139 is communicatively connected to a first oil passage 140. The first oil passage 140 is coaxially formed in the second main shaft 106 for the purpose of supplying oil to every portion that needs lubrication within the gear transmission mechanism 103 and to the interstice between the first and the second main shafts 105 and 106. Along with the rotation, a centrifugal force acts on the oil in the first hydraulic chamber 137 that is in a state of reduced pressure. Even when such a centrifugal force causes a force pressing the first piston 135, a similar centrifugal force also acts on the oil in the canceller chamber 139. Accordingly, what can be avoided is the undesired movement of the first piston 135 to the side where the first piston 135 presses the first and the second frictional plates 132 and 133 against the first pressure receiving plate 134.

The second clutch 125 is disposed so as to be arranged side by side with the first clutch 124 along the axial direction of the second main shaft 106, and to sandwich the first clutch 124 with the primary reduction apparatus 101. The second clutch 125 includes the clutch outer 126, a second clutch inner 141, a plurality of third frictional plates 142, a plurality of fourth frictional plates 143, a second pressure receiving plate 144, a second piston 145, and a second spring 146. The second clutch inner 141 is coaxially surrounded by the clutch outer 126. In addition, the second clutch inner 141 is coupled onto the second main shaft 106, and is not allowed to rotate independently of the second main shaft 106. The third frictional plates 142 engage with the clutch outer 126, and are not allowed to rotate independently of the clutch outer 126. The fourth frictional plates 143 engage with the second clutch inner 141, and are not allowed to rotate independently of the second clutch inner 141. The fourth frictional plates 143 are alternately laid over the third frictional plates 142. The second pressure receiving plate 144 is disposed on the second clutch inner 141 so as to face the third and the fourth frictional plates 142 and 143, which are alternately laid over one another. The second piston 145 presses the third and the fourth frictional plates 142 and 143 against the second pressure receiving plate 144. The second spring 146 biases the second piston 145.

An end-wall member 148 is fixedly disposed on the second clutch inner 141, so that a second hydraulic chamber 147 that faces the back face of the second piston 145 is formed between the end-wall member 148 and the second piston 145. In response to the increase in the hydraulic pressure of the second hydraulic chamber 147, the second piston 145 presses the third and the fourth frictional plates 142 and 143 against the second pressure receiving plate 144. As a consequence, the second clutch 125 becomes the connected state, in which the power transmitted from the crankshaft 36 to the clutch outer 126 is transmitted to the second main shaft 106. In addition, a canceller chamber 149 is formed between the second clutch inner 141 and the second piston 145 so as to face the front face of the second piston 145. The second spring 146 is set in the canceller chamber 149, and exerts the spring force to the direction which reduces the capacity of the second hydraulic chamber 147.

The canceller chamber 149 is communicatively connected to a second oil passage 150, which is to be described later. Along with the rotation, a centrifugal force acts on the oil in the second hydraulic chamber 147 that is in a state of reduced pressure. Even when such a centrifugal force causes a force pressing the second piston 145, a similar centrifugal force also acts on the oil in the canceller chamber 149. Accordingly, what can be avoided is the undesired movement of the second piston 135 to the side where the second piston 145 presses the third and the fourth frictional plates 142 and 143 with against the second pressure receiving plate 144.

Inside the clutch cover 92 covering the first and the second clutches 124 and 125 from the right-hand side when viewed to the forwarding direction of the motorcycle, a first, a second and a third separation-wall members 151, 152, and 153 are fastened. In addition, between the second main shaft 106 and the first separation-wall member 151, a first tubular member 155 is disposed so as to form a first oil channel 154, which leads to the first hydraulic chamber 137 of the first clutch 124. Between the second main shaft 106 and the second separation-wall member 152, a second tubular member 156 is disposed so as to coaxially surround the first tubular member 155. Accordingly, the ring-shaped second oil passage 150 leading to the canceller chamber 149 of the second clutch 125 is formed between the second tubular member 156 and the first tubular member 155. Between the second main shaft 106 and the third separation-wall member 153, a third tubular member 158 is disposed so as to coaxially surround the second tubular member 156. Accordingly, a ring-shaped second oil channel 157 leading to the second oil chamber 147 is formed between the third tubular member 158 and the second tubular member 156.

Referring back to FIG. 8, in the gear transmission mechanism 103, the fourth-speed gear train G4, the sixth-speed gear train G6, and the second-speed gear train G2 are disposed between the first main shaft 105 and the counter shaft 107, and are arranged in this order from the side opposite from the clutch apparatus 102. The second-speed gear train G2 is composed of a second-speed drive gear 160 and a second-speed driven gear 161, which mesh with each other. The second-speed drive gear 160 is formed integrally with the first main shaft 105. The second-speed driven gear 161 is supported on the counter shaft 107 and is allowed to rotate independently of the counter shaft 107. The sixth-speed gear train G6 is composed of a sixth-speed drive gear 162 and a sixth-speed driven gear 163, which mesh with each other. The sixth-speed drive gear 162 is supported on the first main shaft 105 and is allowed to rotate independently of the first main shaft 105. The sixth-speed driven gear 162 is supported on the counter shaft 107. The sixth-speed driven gear 162 is allowed to move in the axial direction of the counter shaft 107, but is not allowed to rotate independently of the counter shaft 107. The fourth-speed gear train G4 is composed of a fourth-speed drive gear 164 and a fourth-speed driven gear 165, which mesh with each other. The fourth-speed drive gear 164 is supported on the first main shaft 105. The fourth-speed drive gear 164 is allowed to move in the axial direction of the first main shaft 105, but is not allowed to rotate independently of the first main shaft 105. The fourth-speed driven gear 165 is supported on the counter shaft 107 and is allowed to rotate independently of the counter shaft 107.

A first shifter 166 is supported on the counter shaft 107 and is located between the second-speed driven gear 161 and the fourth-speed driven gear 165. The first shifter 166 is not allowed to rotate independently of the counter shaft 107, but is allowed to move in the axial direction of the counter shaft 107. The first shifter 166 accomplishes the switching among the following states: a state where the first shifter 166 engages with the second-speed driven gear 161; a state where the first shifter 166 engages with the fourth-speed driven gear 165; and a neutral state where the first shifter 166 engages with neither the second-speed driven gear 161 nor the fourth-speed driven gear 165. In addition, the sixth-speed driven gear 163 is formed integrally with the first shifter 166. Moreover, a second shifter 167 is supported on the first main shaft 105. The second shifter 167 is not allowed to rotate independently of the first main shaft 105, but is allowed to move in the axial direction of the first main shaft 105. The fourth-speed drive gear 164 is formed integrally with the second shifter 167. The second shifter 167 is capable of switching between a state where the second shifter 167 engages with the sixth-speed drive gear 162 and a state where the second shifter 167 and the sixth-speed drive gear 162 are disengaged.

While the second shifter 167 and the sixth-speed drive gear 162 are disengaged, the engagement of the first shifter 166 with the second-speed driven gear 161 accomplishes the selection of the second-speed gear train G2. While the second shifter 167 and the sixth-speed drive gear 162 are disengaged, the engagement of the first shifter 166 with the fourth-speed driven gear 165 accomplishes the selection of the fourth-speed gear train G4. While the first shifter 166 is in the neutral position, the engagement of the second shifter 167 with the sixth-speed drive gear 162 accomplishes the selection of the sixth-speed gear train G6.

The first-speed gear train G1, the fifth-speed gear train G5, and the third-speed gear train G3 are disposed between the counter shaft 107 and the portion of second main shaft 106 sticking out from the second end portion of the first main shaft 105. The first-speed gear train G1, the fifth-speed gear train G5, and the third-speed gear train G3 are arranged in this order from the side opposite from the clutch apparatus 102. The third-speed gear train G3 is composed of a third-speed drive gear 168 and a third-speed driven gear 169, which mesh with each other. The third-speed drive gear 168 is supported on the second main shaft 106. The third-speed drive gear 168 is allowed to move in the axial direction of the second main shaft 106, but is not allowed to rotate independently of the second main shaft 106. The third-speed driven gear 169 is supported on the counter shaft 107 and is allowed to rotate independently of the counter shaft 107. The fifth-speed gear train G5 is composed of a fifth-speed drive gear 170 and a fifth-speed driven gear 171, which mesh with each other. The fifth-speed drive gear 170 is supported on the second main shaft 106 and is allowed to rotate independently of the second main shaft 106. The fifth-speed driven gear 171 is supported on the counter shaft 107. The fifth-speed driven gear 171 is allowed to move in the axial direction of the counter shaft 107, but is not allowed to rotate independently of the counter shaft 107. The first-speed gear train G1 is composed of a first-speed drive gear 172 and a first-speed driven gear 173, which mesh with each other. The first-speed drive gear 172 is formed integrally with the second main shaft 105. The first-speed driven gear 173 is supported on the counter shaft 107 and is allowed to rotate independently of the counter shaft 107.

A third shifter 174 is supported on the second main shaft 106. The third shifter 174 is not allowed to rotate independently of the second main shaft 106, but is allowed to move in the axial direction of the second main shaft 106. The third-speed drive gear 168 is formed integrally with the third shifter 174. The third shifter 174 is capable of switching between a state where the third shifter 174 engages with the fifth-speed drive gear 170 and a state where the third shifter 174 and the fifth-speed drive gear 170 are disengaged. In addition, a fourth shifter 175 is supported on the counter shaft 107 and is located between the third-speed driven gear 169 and the first-speed driven gear 173. The fourth shifter 175 accomplishes the switching among the following states: a state where the fourth shifter 175 engages with the third-speed driven gear 169; a state where the fourth shifter 175 engages with the first-speed driven gear 173; and a neutral state where the fourth shifter 175 engages with neither the third-speed driven gear 169 nor the first-speed driven gear 173. Moreover, the fifth-speed driven gear 171 is formed integrally with the fourth shifter 175.

While the third shifter 174 and the fifth-speed drive gear 170 are disengaged, the engagement of the fourth shifter 175 with the first-speed driven gear 173 accomplishes the selection of the first-speed gear train G1. While the third shifter 174 and the fifth-speed drive gear 170 are disengaged, the engagement of the fourth shifter 175 with the third-speed driven gear 169 accomplishes the selection of the third-speed gear train G3. While the fourth shifter 175 is in the neutral position, the engagement of the third shifter 174 with the fifth-speed drive gear 170 accomplishes the selection of the fifth-speed gear train G5.

The first to the fourth shifter 166, 167, 174, and 175 are rotatably held by a first to a fourth shift forks 176, 177, 178, and 179, respectively. The drive of the first to the fourth shift forks 176, 177, 178, and 179 in the axial direction of the main shafts 105 and 106, and the counter shaft 107 moves the first to the fourth shifter 166, 167, 174, and 175 in the axial direction.

Figure 10:
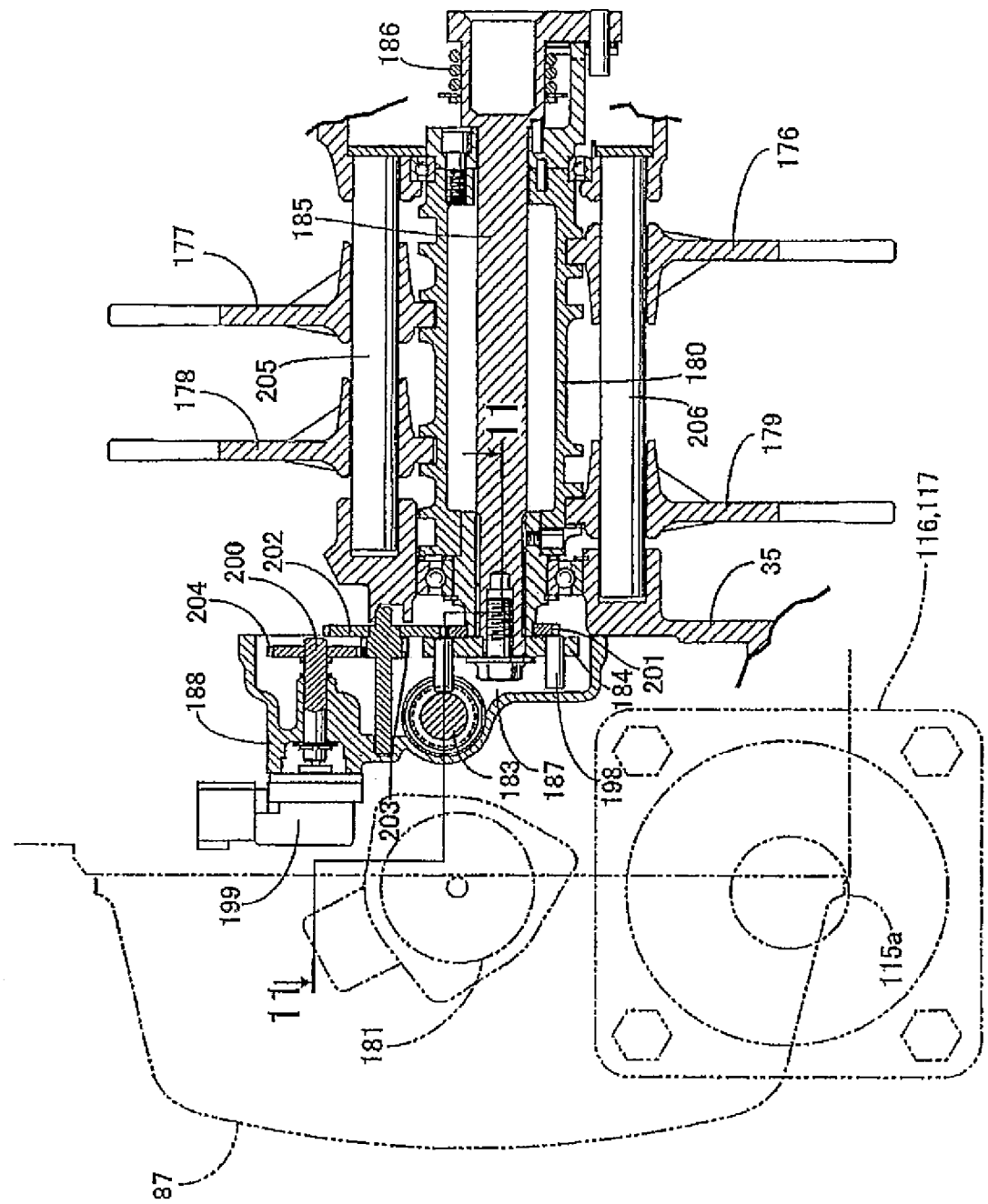
FIG. 10 is an enlarged sectional view taken along the line 10-10 of FIG. 2.

Referring to FIG. 10, a shift drum 180 is rotatably supported by the crankcase 35 with its axis arranged in parallel to the axis of the crankshaft 36. The first to the fourth shift forks 176 to 179 engage with the outer circumference of the shift drum 180. Shift-fork shafts 205 and 206 are supported by the crankcase 35 with their respective axes arranged in parallel to the shift drum 180. The first to the fourth shift forks 176 to 179 are slidably supported on the shift-fork shafts 205 and 206. Along with the rotational movement of the shift drum 180, the shift forks 176 to 179 move sliding on the shift forks 205 and 206.

The shift drum 180 is driven to rotate by the power generated by a shift-driving electric motor 181, which is a shift actuator. The shift-driving electric motor 181 is attached to the side surface of the crankcase 35. The shift-driving electric motor 181 is attached to either one of the right-hand and left-hand side surfaces of the crankcase 35, in the state when engine main body 33 is mounted on the vehicle-body frame F. In this embodiment, the shift-driving electric motor 181 is attached to the left-hand side surface of the crankcase 35. Here, the first and the second gear covers 116 and 117 are detachably coupled to the left-hand side surface of the crankcase 35 so as to cover the shaft end of the counter shaft 107 of the gear transmission mechanism 103. The shift-driving electric motor 181 is disposed above the first and the second gear covers 116 and 117 and at a position located closer to the center than the outer end of the first and the second gear covers 116 and 117 along the axial direction of the counter shaft 107. The alternator cover 87 is also attached to the left-hand side surface of the crankcase 35. The shift-driving electric motor 181 is disposed to the rear of the alternator cover 87 as shown in FIG. 2, and is disposed at a position located closer to the center than the outer end of the alternator cover 87 along the axial direction of the shift drum 180, that is, along the axial direction of the crankshaft 36 as shown in FIG. 10.

The shift-driving electric motor 181 is attached to the left-hand side surface of the crankcase 35 as shown in FIG. 2. The operational axis, that is, the rotational axis C1, of the shift-driving electric motor 181 is placed within a plane that is orthogonal to the direction of the shafts in the gear transmission mechanism 103. In addition, the rotational axis C1 slopes in the up-and-down direction. More specifically, in this embodiment, the rotational axis C1 is directed upwards to the front.

Figure 11:
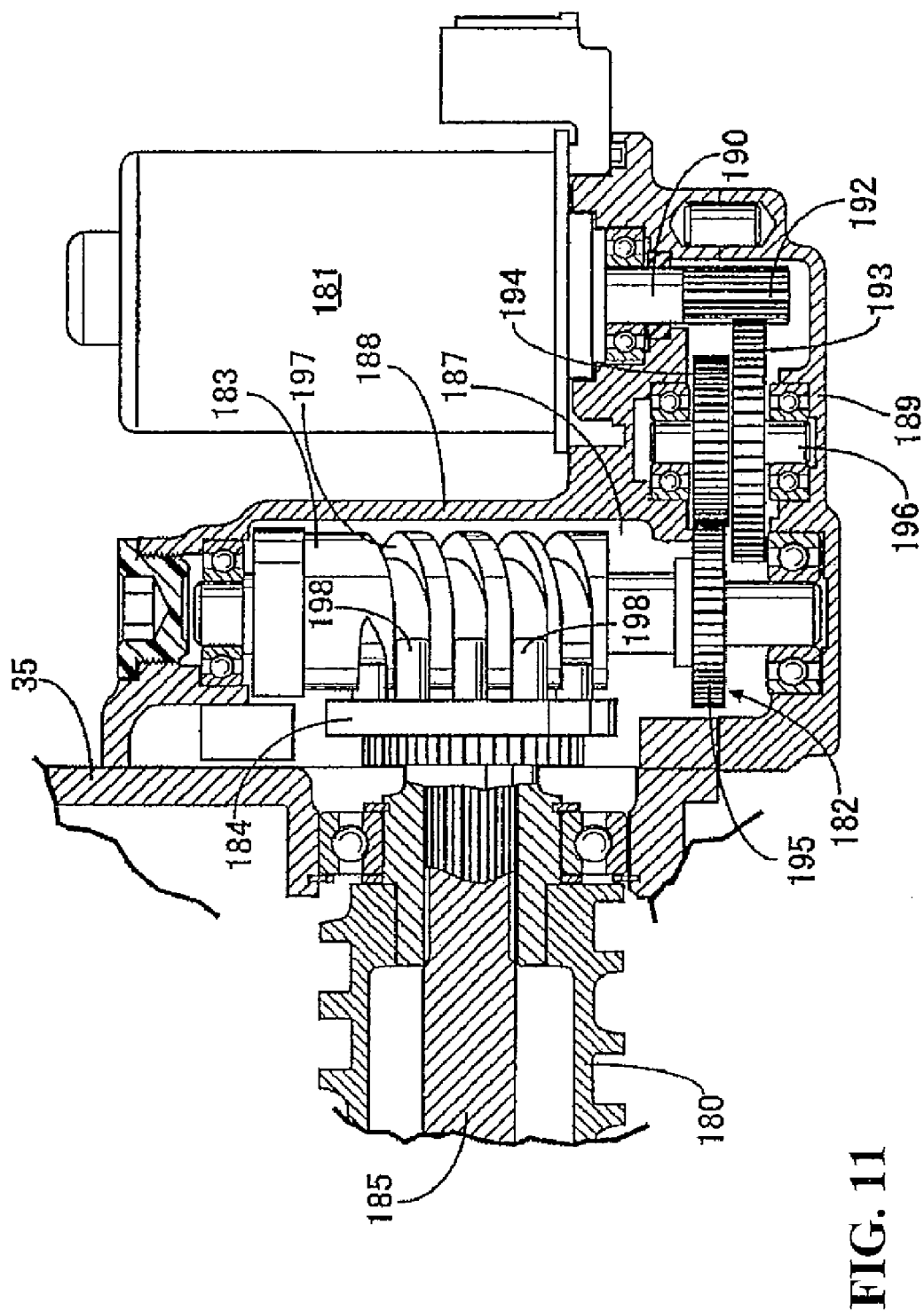
FIG. 11 is a sectional view taken along the line 11-11 of FIG. 10.

Referring also to FIG. 11, the power generated from the shift-driving electric motor 181 is transmitted to a first end of the shift drum 180 in the axial direction thereof via a reduction-gear mechanism 182, a barrel cam 183, a disc-shaped transmitting rotation member 184, a transmitting shaft 185, and a lost-motion spring 186.

A case member 188 is fastened to the left-hand side surface of the crankcase 35. Accordingly, the case member 188 forms an operation chamber 187 between the crankcase 35, and the reduction-gear mechanism 182, the barrel cam 183, and the transmitting rotation member 184 are set in the operation chamber 187. A lid member 189 is attached to the case member 188 so that the open end of the case member 188 is closed by the lid member 189. The shift-driving electric motor 181 is attached to the case member 188 with the motor shaft 190 of the shift-driving electric motor 181 sticking into the operation chamber 187.

The gear-reduction mechanism 182 includes a drive gear 192 which is attached on the motor shaft 190 of the shift-driving electric motor 181, a first intermediate gear 193 which mesh with the drive gear 192, a second intermediate gear 194 which rotates along with the first intermediate gear 193, and a driven gear 195 which is disposed on the barrel cam 183 and meshes with the second intermediate gear 194.

The first and the second intermediate gears 193 and 194 are provided on the rotation shaft 196 which is rotatably supported at a first end by the case member 188 and at the other end by the lid member 189. The barrel cam 183 has one of its two ends rotatably supported by the case member 188 and the other one thereof rotatably supported by the lid member 189.

A spiral cam groove 197 is formed in the outer circumference of the barrel cam 183. Meanwhile, the transmitting rotation member 184 is disposed so as to face the outer circumference of the barrel cam 183, and rotates about the same axis which the shift drum 180 rotates about. The transmitting rotation member 184 is provided with plural engagement pins 198, 198, which are equidistantly arranged in the circumferential direction. The plurality of engagement pins 198, 198 are capable of selectively engaging with the cam groove 197. When the barrel cam 183 rotates, the plurality of engagement pins 198, 198 engage with the cam groove one after another and are fed consecutively Torque is transmitted to the transmitting rotation member 184 in this way.

An end portion of the transmitting shaft 185 is coaxially coupled to the transmitting rotation member 184, and is not allowed to rotate independently of the transmitting rotation member 184. The transmitting shaft 185 coaxially penetrates the shift drum 180 and is allowed to rotate independently of the shift drum 180. The lost-motion spring 186 is set between a second end portion of the transmitting shaft 185 and the corresponding end portion of the shift drum 180. The torque produced by the rotational movement of the transmitting shaft 185 is transmitted to the shift drum 180 via the lost-motion spring 186.

A shift sensor 199 is attached to the case member 188 for detecting the rotational position of the shift drum 180. A detection shaft 200 of the shift sensor 199 is rotatably supported by the case member 188.

A drive gear 201 is provided to rotate along with the shift drum 180 and meshes with a third intermediate gear 202. A fourth intermediate gear 203 is provided to rotate along with the third intermediate gear 202 and meshes with a driven gear 204 which is disposed on the detection shaft 200.

Referring to FIG. 2, a water pump 208 is attached to the left-hand side surface of the crankcase 35 at a position below the alternator cover 87. Inside the crankcase 35, a first and a second oil pumps 209 and 210, and a scavenging pump 211 are installed coaxially with the water pump 208. The first and the second oil pumps 209 and 210, and the scavenging pump 211 are operated to rotate along with the water pump 208. By use of an endless chain 212, the rotational power from the driven gear 129 of the primary reduction apparatus 101 is transmitted to the water pump 208, the first and the second oil pump 209 and 210, and the scavenging pump 211. As shown in FIGS. 8 and 9, the sprocket 213 is engaged to the driven gear 129 and is rotatably supported on the first main shaft. Moreover, the chain 212 is looped around the sprocket 213 and the driven sprocket 214 which is linked to each one of the water pump 208, the first and the second oil pump 209 and 210, and the scavenging pump 211.

Figure 12:
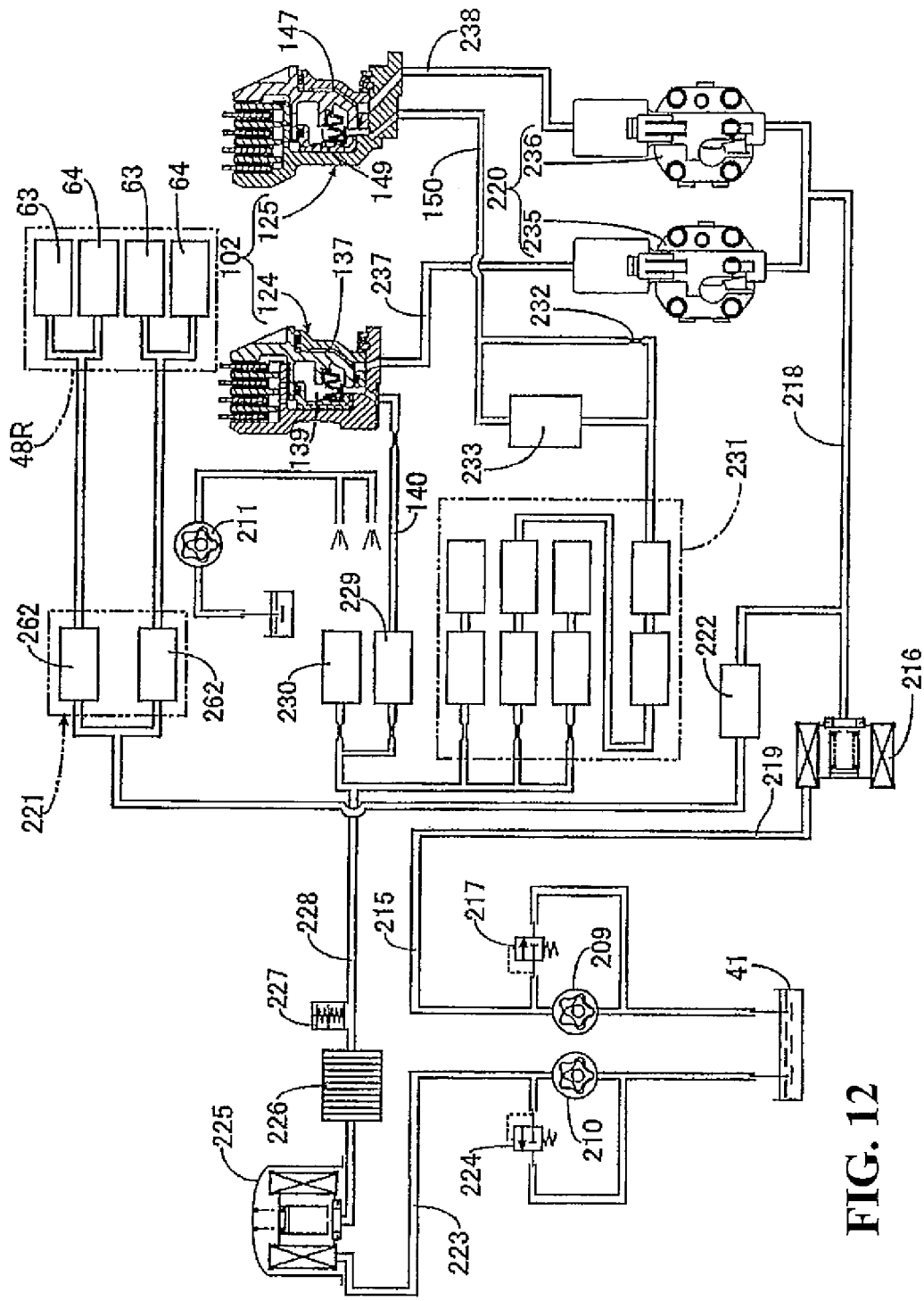
FIG. 12 is a system diagram for illustrating the configuration of a hydraulic system.

Referring to FIG. 12, the first oil pump 209 ejects hydraulic oil for switching the connection and the disconnection of the first and the second clutches 124 and 125 of the clutch apparatus 102. The hydraulic oil is also used for the switching operation of the inlet-side valve-action-status changing mechanism 63 and the exhaust-side valve-action-status changing mechanism 64 in the rear-side bank valve-lifting apparatus 48R. The oil pumped up from the oil pan 41 and ejected from the first oil pump 209 flows through an oil channel 215 and reaches a first oil filter 216 while a relief valve 217 is connected to the oil channel 215. The oil purified by the first oil filter 216 flows separately into two ways through a first and a second branch oil channels 218 and 219. The first branch oil channel 218 is connected to a clutch control apparatus 220, which is provided to switch the connection and the disconnection of the clutch apparatus 102. The second branch oil channel 219 is connected to a valve-lifting hydraulic control apparatus 221 which is provided to operate the switching for the inlet-side valve-action-status changing mechanism 63 and of the exhaust-side valve-action-status changing mechanism 64 in the rear-side bank valve-lifting apparatus 48R. A pressure-reduction valve 222 is installed in the course of the second branch oil channel 219.

The second oil pump 210 supplies lubricant oil to each portion to be lubricated in the engine E. The oil pumped up from the oil pan 41 and ejected from the second oil pump 210 flows through an oil passage 223 and reaches a second oil filter 225, and a relief valve 224 is connected in the course of the oil passage 223. The oil purified by the second oil filter 225 flows through an oil passage 228, and an oil cooler 226 is installed in the course of the oil passage 228. In addition, a pressure sensor 227 is connected to the oil passage 228.

The oil ejected out of the oil passage 228 is supplied to a lubrication target 229 around the first and the second main shafts 105 and 106 in the gear transmission mechanism 103, to a lubrication target 230 around the counter shaft 107 in the gear transmission mechanism 103, and to plural lubrication target 231 in the engine main body 33. The oil that has flowed through the portion to be lubricated 229 around the first and the second main shafts 105 and 106 is then lead to the first oil passage 140, which is communicatively connected to the canceller chamber 137 in the first clutch 124. The oil that flows through the portion to be lubricated 231 is then supplied, via a diaphragm 232, to the second oil passage 150, which is communicatively connected to the canceller chamber 149 in the second clutch 125. A electromagnetically opening-and-closing valve 233 is connected in parallel to the diaphragm 232 so that the oil can be supplied to the canceller chamber 149 smoothly.

Figure 13:
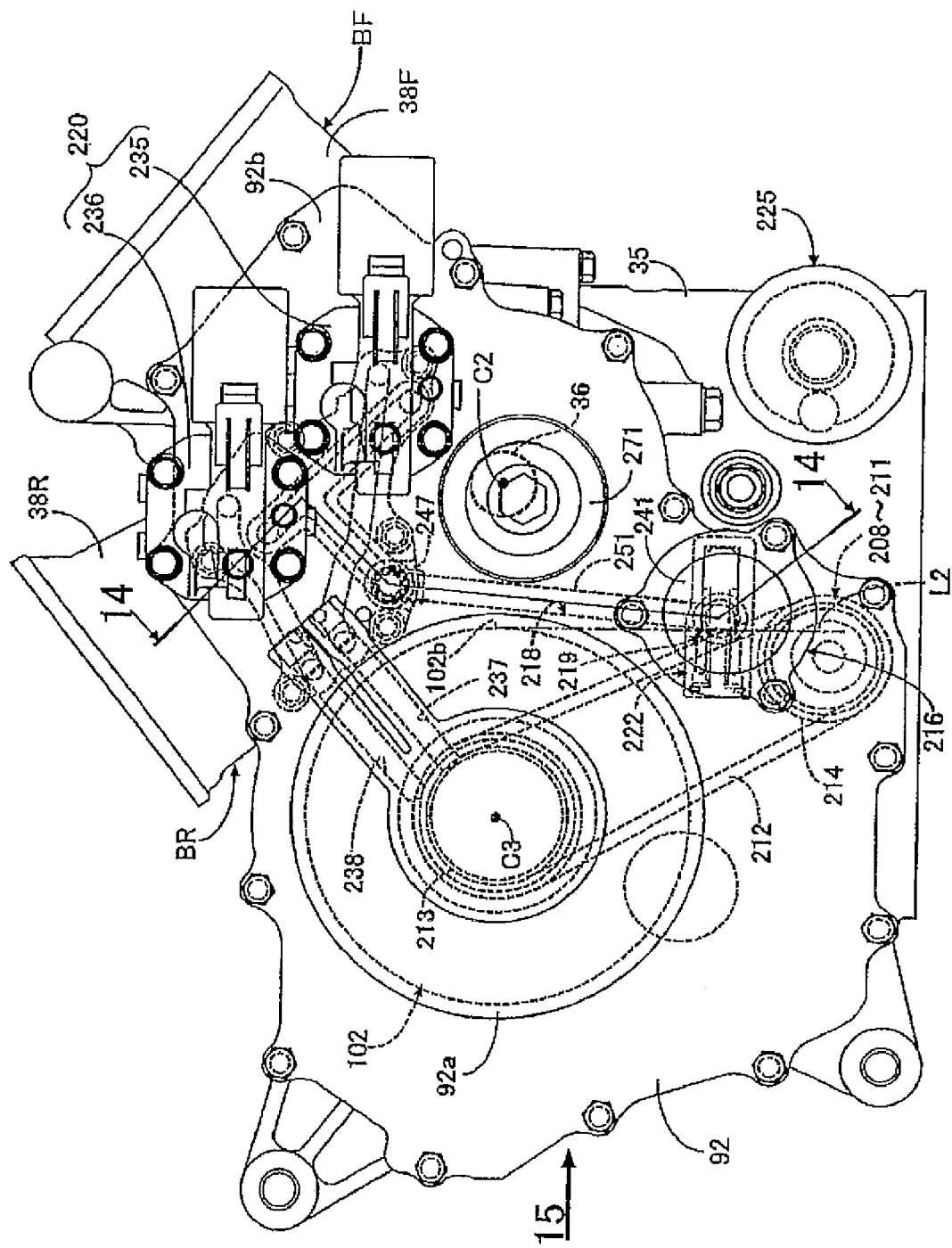
FIG. 13 is an enlarged view of a principal portion of FIG. 3.
Figure 14:
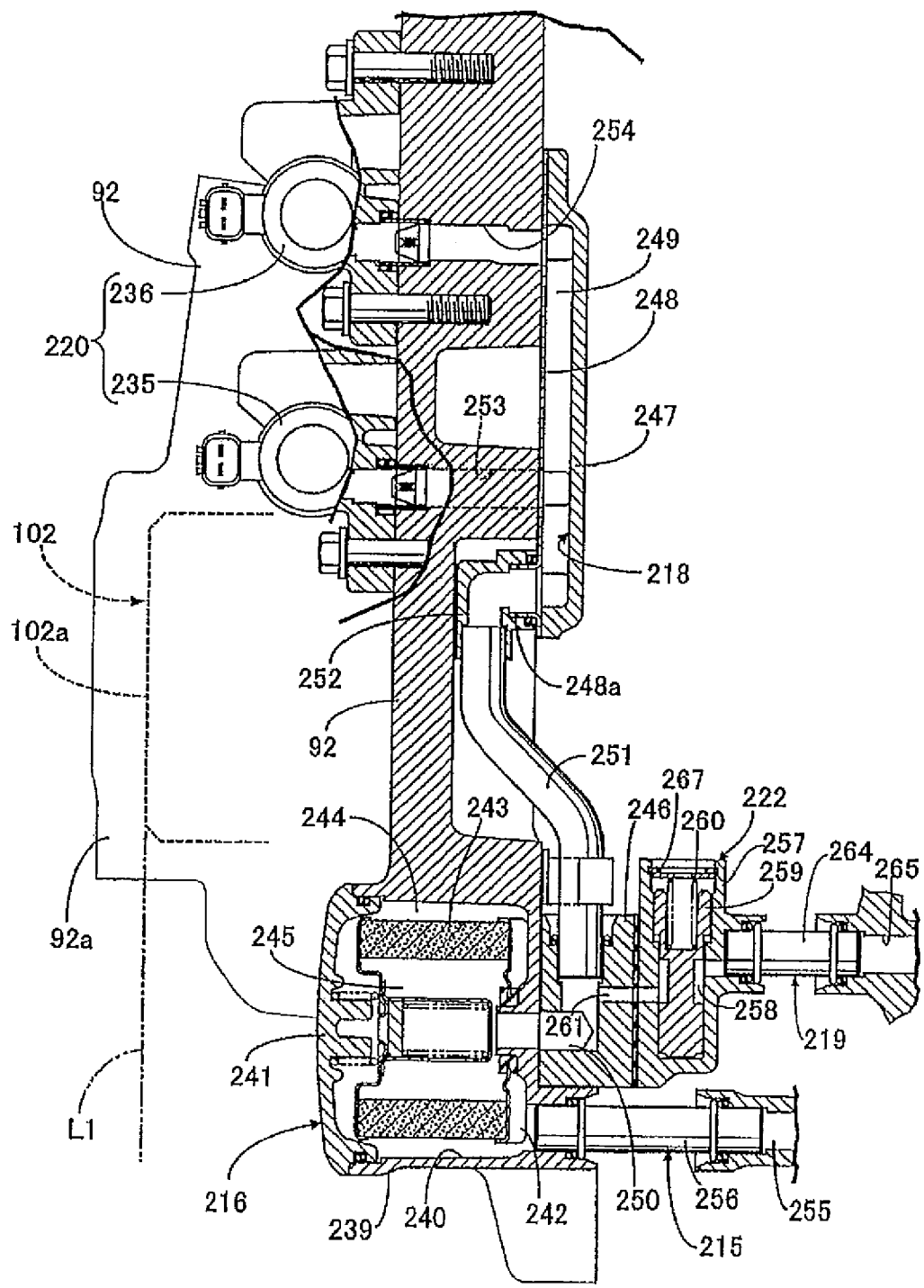
FIG. 14 is a sectional view taken along the line 14-14 of FIG. 13.

Referring also to FIGS. 13 and 14, the clutch control apparatus 220 is composed of a first electromagnetic control valve 235 and a second electromagnetic control valve 236. The first electromagnetic control valve 235 switches the application and the release of the hydraulic pressure to and from the first hydraulic chamber 137 in the first clutch 124. Meanwhile, the second electromagnetic control valve 236 switches the application and the release of the hydraulic pressure to and from the second hydraulic chamber 147 in the second clutch 125. The clutch control apparatus 220 is disposed at the right-hand side of the front-side cylinder block 38F of the front-side bank BF, and is attached to the outer surface of the clutch cover 92. In addition, the clutch control apparatus 220 is disposed in a position farther from the center than the clutch apparatus 102 when viewed from the direction along the axes of the shafts of the clutch apparatus 102. More specifically, a protruding portion 92a and an extending portion 92b are formed in the clutch cover 92. At a position corresponding to the clutch apparatus 102, the protruding portion 92a protrudes outwardly towards a side so that the clutch apparatus 102 is set therein. The extending portion 92b extends from the protruding portion 92a to a position located at the right-hand side of the front-side cylinder block 38F. The clutch control apparatus 220 is attached to the extending portion 92b.

The first and the second electromagnetic control valves 235 and 236, which the clutch control apparatus 220 is composed of, are disposed at positions which are different from each other both in the front-and-rear direction and in the up-and-down direction, as shown in FIG. 13. Of the first and the second electromagnetic control valves 235 and 236, the second electromagnetic control valve 236, is disposed above the first electromagnetic control valve 235, and above the crankshaft 36. In addition, at least a part (most of in this embodiment) of the first electromagnetic control valve 235, which is a valve disposed at a lower position of the two, is disposed at a position located at the front of the crankshaft 36.

Figure 15:
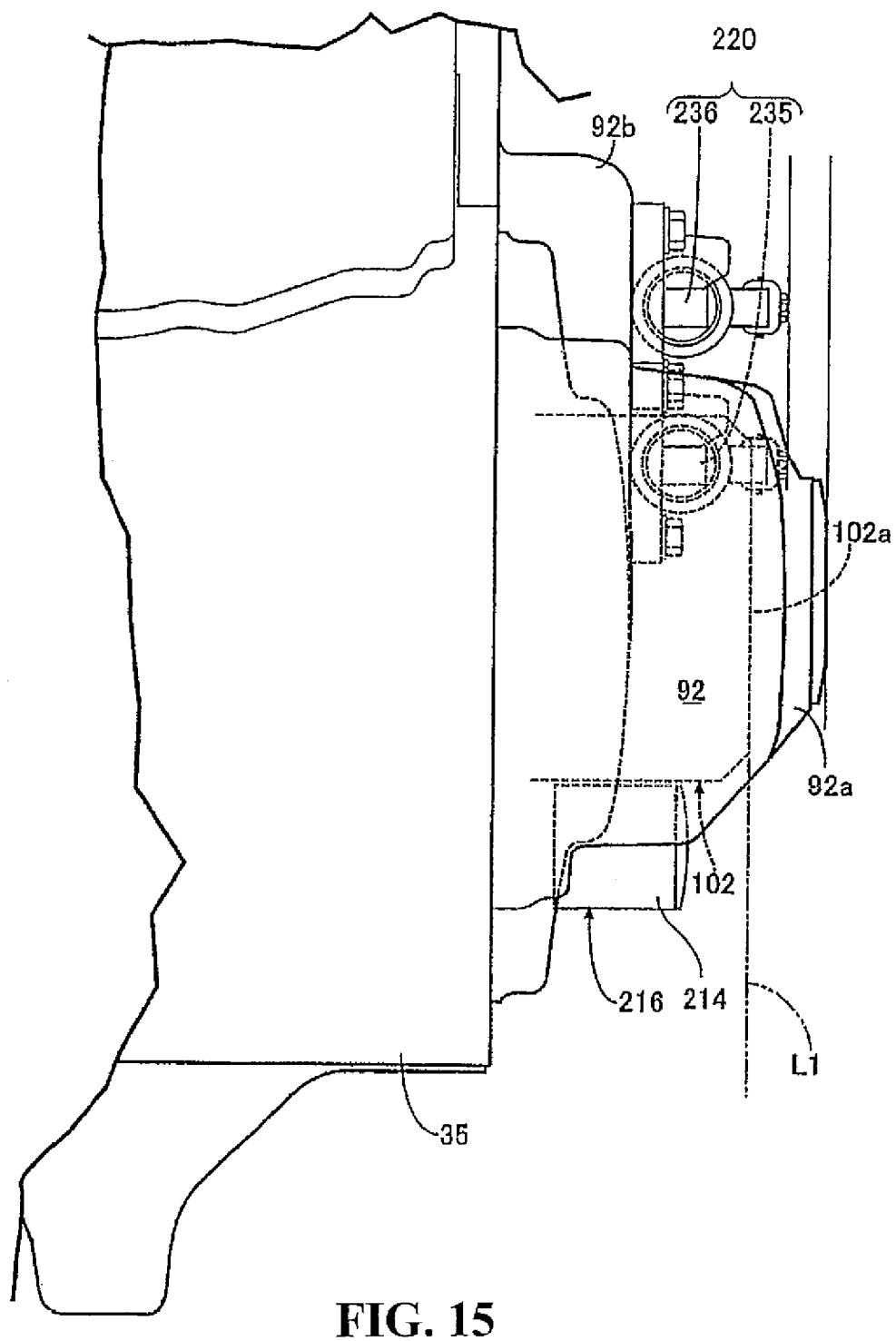
FIG. 15 is a view shown as indicated by the arrow 15 of FIG. 13.

In addition, as FIG. 15 shows, the clutch apparatus 102 is attached to the outer surface of the extending portion 92b of the clutch cover 92, in a position located closer to the center than outermost end of the clutch cover 92, that is, protruding portion 92a.

An oil channel 237 and oil channel 238 are formed in the clutch cover 92. The oil channel 237 connects the first electromagnetic control valve 235 with the first oil channel 154, which is communicatively connected to the first hydraulic chamber 137 of the first clutch 124. Meanwhile, the oil channel 238 connects the second electromagnetic control valve 236 with the second oil channel 157, which is communicatively connected to the second hydraulic chamber 147 of the second clutch 125.

Referring to FIG. 14, the first oil filter 216 disposed in the clutch cover 92 is placed on the opposite side in the width direction of the vehicle-body frame F to the side stand 34. The first oil filter 216 is placed between the axis C2 of the crankshaft 36 and the axial line C3 of the clutch apparatus 102 in the front-and-rear direction and below these axes C2 and C3 in the up-and-down direction.

A filter case 239 of the first oil filter 216 protrudes outwards from the crankcase 35 of the engine main body 33. The filter case 239 is formed integrally with the clutch cover 92, and has a cylindrical shape that forms a bottomed housing hole 240 with its outer end open. A lid member 241 is fastened to the filter case 239 so as to close the opening portion at the outer end of the housing hole 240.

A support frame 242, which is held between the closed inner end portion of the housing hole 240 and the lid member 241, is installed in the filter case 239. A cylindrical filtration material 243 is supported by the support frame 242. A ring-shaped pre-purification chamber 244 is formed around the filtration material 243 while a purification chamber 245 is formed inside the filtration material 243.

The first oil filter 216 thus configured is disposed below the crankshaft 36 and farther to the center than the clutch apparatus 102 when viewed along the axial direction of the clutch apparatus 102. To be more specific, the first oil filter in this embodiment is disposed at a position located obliquely downward to the front from the clutch apparatus 102 as shown in FIG. 2. In the first oil filter 216 thus disposed, at least a part of the filtration material 243, which is a constituent element of the first oil filter 216, sticks out of the outer surface of the clutch cover 92 along the axial direction of the crankshaft 36, but the filtration material 243 is placed closer to the center than the outermost end of the protruding portion 92a of the clutch cover 92 when viewed from the axial direction of the clutch apparatus 102.

In addition, as FIG. 13 clearly shows, the first oil filter 216 is disposed in the clutch cover 92 so that a part of the first oil filter 216 is laid over the water pump 208, the first and the second oil pumps 209 and 210, and the scavenging pump 211 when viewed from a side.

In addition, as FIGS. 14 and 15 show, the first oil filter 216 is located in a position closer to the center than a vertical line L1 which passes on an outer end 102a of the clutch apparatus 102 in the axial direction of the clutch apparatus 102 when viewed in the direction orthogonal to the axes of the crankshaft 36 and the clutch apparatus 102. In addition, as FIG. 13 shows, when viewed from a side of a direction along the axis of the crankshaft 36 and of the clutch apparatus 102, the first oil filter 216 is disposed so that a vertical line L2 passing on a forefront end 102b of the clutch apparatus 102 passes on the first oil filter 216 Accordingly, the first oil filter 216, in a plan view, is laid over a part of the clutch apparatus 102, and is disposed at a position closer to the center than the outer end 102a of the clutch apparatus 102 in the axial direction of the clutch apparatus 102.

A connection member 246 is fastened to the inner surface of the clutch cover 92 at a portion corresponding to the first oil filter 216. Meanwhile, an oil-channel formation member 247 is fastened to the inner surface of the clutch cover 92 at a position near the clutch control apparatus 220 and a flat-plate-shaped separation-wall member 248 is placed between the oil-channel formation member 247 and the clutch cover 92. An oil channel 249 is formed between the oil-channel formation member 247 and the separation-wall member 248. The connection member 246 forms a connection oil channel 250 that is communicatively connected to the purification chamber 245 of the first oil filter 216. A connection tube 251 extends towards the oil-channel formation member 247, and a first end of the connection tube 251 is liquid-tightly fitted to the connection oil channel 250. A second end of the connection tube 251 is fitted to a joint member 252, and the joint member 252 is liquid-tightly fitted to a cylindrical fitting pipe portion 248a formed in the separation-wall member 248. In addition, oil channels 253 and 254 are formed in the clutch cover 92. The oil channels 253 and 254 connect respectively the first and the second electromagnetic control valves 235 and 236 to the oil channel 249 located between the oil-channel formation member 247 and the separation-wall member 248.

Accordingly, the purification chamber 245 of the first oil filter 216 is connected to the connection oil channel 250, the connection tube 251, the joint member 252, the oil channel 249, and the oil channels 253 and 254. Here, the connection oil channel 250, the connection tube 251, the joint member 252, the oil channel 249, and the oil channels 253 and 254 form the first branch oil channel 218 described above with reference to FIG. 12.

The oil channel 215, which connects the pre-purification chamber 244 of the first oil filter 216 and the ejection port of the first oil pump 209, is composed of an oil channel 255 and a connection tube 256. The oil channel 255 is formed in the crankcase 35 and leads to the ejection port of the first oil pump 209. Meanwhile the connection tube 256 connects the oil channel 255 to the pre-purification chamber 244. An end of the connection tube 256 is liquid-tightly fitted to an end portion of the oil channel 255 and the other end of the connection tube is liquid-tightly fitted to the clutch cover 92.

A valve housing 257 of the pressure-reduction valve 222 sandwiches the connection member 246 with the inner surface of the clutch cover 92, and is coupled to the clutch cover 92 together with the connection member 246. The pressure-reduction valve 222 includes a valve body 259, which is slidably fitted into the valve housing 257. An oil chamber 258 is thus formed between the valve body 259 and a first end of the valve housing 257. Also included in the pressure-reduction valve 222 are: a spring-reception member 267, which is disposed on a second end side of the valve housing 257; and a spring 260, which is provided between the spring-reception member 267 and the valve body 259. The spring 260 biases the valve body 259 to a side so as to reduce the capacity of the oil chamber 258.

A channel 261 is formed in the connection member 246 and in the valve housing 257 and connects the oil channel 250 of the connection member 246 to the oil chamber 258. The passage 261 is the branching point of the first and the second branch oil channels 218 and 219.

The pressure-reduction valve 222 reduces the hydraulic pressure of the oil chamber 258 down to a determined level by reciprocal sliding movement of the valve body 259 to equilibrate the hydraulic force caused by the hydraulic pressure of the oil chamber 258 with the spring force of the spring 260. The hydraulic pressure reduced by the pressure-reduction valve 222 is introduced to the valve-lifting hydraulic control apparatus 221.

The above-described way of disposing the pressure-reduction valve 222 allows the pressure-reduction valve 222 to be placed in the close proximity to the first oil filter 216. In addition, as FIG. 13 clearly shows, when viewed from the axial direction of the first oil filter 216, at least a part of the pressure-reduction valve 222 can be laid over the first oil filter 216.

The valve-lifting hydraulic control apparatus 221 includes a pair of electromagnetic control valves 262, 262 corresponding respectively to the two cylinders of the rear-side bank BR, and is attached to the left-hand side surface of the rear-side cylinder head 39R of the rear-side bank BR.

One of the electromagnetic control valves 262, 262 controls the hydraulic pressure of the inlet-side and the exhaust-side valve-action-status changing mechanisms 63 and 64 of one of the two cylinders. Meanwhile, the other of the electromagnetic control valves 262, 262 controls the hydraulic pressure of the inlet-side and the exhaust-side valve-action-status changing mechanisms 63 and 64 of the other of the two cylinders.

The oil with a hydraulic pressure reduced by the pressure-reduction valve 222 is introduced to the valve-lifting hydraulic control apparatus 221 via a connection tube 264, an oil channel 265, and another oil channel 266. The connection tube 264 has its first end connected to the valve housing 257 and extends towards a side so as to move away from the clutch cover 92. The oil channel 265 is formed in the crankcase 35, and is connected to a second end of the connection tube 264, and extends to the left-hand side surface of the crankcase 35. The oil channel 266, on the other hand, is formed on the left-hand side-surface of the crankcase 35, the rear-side cylinder block 38R, and the rear-side cylinder head 39R. The oil channel 266 connects the oil channel 265 to the valve-lifting hydraulic control apparatus 221. The second branch oil channel 219, where the pressure-reduction valve 222 is installed, includes the connection tube 264, and the oil channels 265 and 266.

The second oil filter 225 is attached to the right-hand side surface of the crankcase 35 at a position located at the front of the first oil filter 216.

Next, the advantageous effects of the embodiment will be described. The shift-driving electric motor 181 to drive and control the gear-shift action of the gear transmission mechanism 103 is attached to the left-hand side surface of the crankcase 35. Accordingly, the arrangement results in a higher degree of freedom in laying out the functional parts disposed around the crankcase 35, and results also in an easier access to the shift-driving electric motor 181 from the outer side of the power unit P. Thus, an easier maintenance work for the shift-driving electric motor 181 is achieved. In addition, the operational axis C1 of the shift-driving electric motor 181 is placed on a plane that is orthogonal to the axial direction of the shafts of the gear transmission mechanism 103. For this reason, though the shift-driving electric motor 181 is attached to the left-hand side surface of the crankcase 35, the amount of protrusion of the shift-driving electric motor 181 from the crankcase 35 can be reduced to the minimum.

In addition, the shaft end of the counter shaft 107 of the gear transmission mechanism 103 is covered with the first and the second gear covers 116 and 117, which are detachably attached to the left-hand side surface of the crankcase 35. The shift-driving electric motor 181 is attached to the left-hand side surface of the crankcase 35 at a position located above the first and the second gear covers 116 and 117 which stretches along the axial direction of the counter shaft 107 and also located at position closer to the center of engine than the first and the second gear covers 116 and 117. Accordingly, the actuator, that is, the shift-driving electric motor 181, is protected by the first and the second gear covers 116 and 117 from the kicked-up stones and splashed-up muddy water that come from below. As a consequence, no special parts dedicated only to the protection of the shift-driving electric motor 181 is necessary, and this reduces the number of component parts as a whole. In addition, such arrangement makes it no longer necessary to provide a boss or the like used to attach a protection cover at a position around the shift-driving electric motor 181. This eliminates a possible constraint that would otherwise be imposed by the boss or the like on the layout of the other component parts, and increases the degree of freedom in laying out the other component parts.

In addition, the alternator cover 87 is also attached to the left-hand side surface of the crankcase 35. The shift-driving electric motor 181 is placed in a position located at the rear of the alternator cover 87 and located closer to the center than the outer end of the alternator cover 87 which stretches along the axial direction of the crankshaft 36. Accordingly, the shift-driving electric motor 181 can be disposed by making use of the space around the alternator cover 87 sticking out from the left-hand side surface of the crankcase 35. This prevents the size of the power unit P from becoming larger, along the axial direction of the crankshaft 36, by the arrangement of the shift-driving electric motor 181. In addition, the alternator cover 87 can be used to protect the shift-driving electric motor 181 from the kicked-up stones and splashed-up muddy water that come from the front-side of the vehicle. As a consequence, no special parts dedicated only to the protection of the shift-driving electric motor 181 is necessary, and this contributes to a reduction of the number of component parts as a whole. In addition, such an arrangement makes it no longer necessary to provide a boss or the like used to attach a protection cover at a position around the shift-driving electric motor 181. This eliminates a possible constraint that would otherwise be imposed by the boss or the like on the layout of the other component parts, and increases the degree of freedom in laying out the other component parts.

In addition, the operational axis C1 of the shift-driving electric motor 181 is directed obliquely in the up-and-down direction. Accordingly when the shift-driving electric motor 181 is attached or detached, the work is not obstructed by the alternator cover 87 located in front of the shift-driving electric motor 181. This makes the maintenance work for the shift-driving electric motor 181 easier.

The clutch cover 92 is attached to the right-hand side of the crankcase 35, and the clutch apparatus 102 is installed in the clutch cover 92. In addition, the clutch control apparatus 220, which controls the switching of the connecting and the disconnecting actions for the clutch apparatus 102, is attached to the outer surface of the clutch cover 92. Here, the clutch control apparatus 220 is disposed at the right-hand side of the front-side cylinder block 38F of the front-side bank BF. Accordingly, the clutch control apparatus 220 receives an air flow more efficiently. This results in a higher cooling performance for the clutch control apparatus 220 while the engine main body 33 is prevented from having a larger total length in the front-and-rear direction thereof. Moreover, component parts of the intake system or the vehicle constituent parts such as vehicle-body frame F are less likely to be placed in a portion corresponding to the outer surface of the clutch cover 92. Accordingly, the attachment of the clutch control apparatus 220 to the outer surface of the clutch cover 92 allows a higher degree of freedom in design for the component parts of the intake system, the vehicle-body frame F, and the like.

In addition, the clutch apparatus 102 is a twin-type clutch that includes the first and the second clutches 124 and 125. The clutch control apparatus 220 includes the first and the second electromagnetic control valves 235 and 236, by which the connection and disconnection of the first and the second clutches 124 and 125 are controlled individually. Moreover, the first and the second electromagnetic control valves 235 and 236 are placed at positions that are different from each other both in the front-and-rear direction and in the up-and-down direction. Accordingly, the first and the second electromagnetic control valves 235 and 236 receive an air flow more efficiently, and this results in an excellent cooling performance for the first and the second electromagnetic control valves 235 and 236.

In addition, of the first and the second electromagnetic control valves 235 and 236, the second electromagnetic control valve 236 is placed above the first electromagnetic control valve 235 and above the crankshaft 36 as well. Moreover, at least a part of (most of, in this embodiment) the first electromagnetic control valve 235 is placed in a position located at the front of the crankshaft 36. Accordingly, the clutch control apparatus 220 is placed in a space extending from a position located above the crankshaft 36 to a position located at the front of the crankshaft 36. Note that the above-mentioned space is larger than a space that is available between the crankshaft 36 and the clutch apparatus 102. In addition, the crankshaft 36 and the clutch apparatus 102 can be placed so that the distance between their respective shafts can be made shorter. Moreover, the first and the second electromagnetic control valve 235 and 236 receive the travelling air more efficiently.

The clutch control apparatus 220 is placed in a position closer to the center than outermost end of the clutch cover 92. Accordingly, the protruding of the clutch control apparatus 220 towards the right-hand side of the crankcase 35 can be reduced to a minimum. As a consequence, the location of the clutch control apparatus 220 does not pose a problem when the bank angle is considered.

In addition, the clutch control apparatus 220 is placed in a position closer to the center than the clutch apparatus 102 when viewed along the axial direction of the clutch apparatus 102. The clutch control apparatus 220 is attached to the outer surface of the clutch cover 92 while avoiding the clutch apparatus 102 that protrudes most towards the right-hand side of the crankcase 35. Accordingly, the power unit P is prevented from becoming larger in size in the right-and-left direction thereof as much as possible.

Moreover, the oil channels 237 and 238, which connect the hydraulic-type clutch apparatus 102 to the clutch control apparatus 220 that controls the hydraulic pressure to be applied to the clutch apparatus 102, are formed in the clutch cover 92. Accordingly, the oil channels 237 and 238 can be shortened, and thus can be simplified. In addition, the maintenance for mechanism that controls the clutch apparatus 102 is made more easily.

In addition, the first oil filter 216 is disposed in the clutch cover 92. The first oil filter is placed at a position located between the axis C2 of the crankshaft 36 and the axis C3 of the clutch apparatus 102 in the front-and-rear direction, and located below the axes C2 and C3 in the up-and-down direction. Accordingly, the first oil filter 216 is disposed by taking advantage of the space that is available below the position between the crankshaft 36 and the clutch apparatus 102. Such a way of disposing the first oil filter 216 helps to secure a certain degree of freedom in design for the component parts placed above the crankshaft 36, such as the inner diameter of each cylinder bore 42, and the location of the timing transmission mechanisms 95 and 98, all of which are located above the crankshaft 36. In addition, in a space below the position located between the axis C2 of the crankshaft 36 and the axis C3 of the clutch apparatus 102, a larger space is available on the side close to the engine main body 33. Accordingly, the protruding of the first oil filter 216 along the axial direction of the crankshaft 36 can be reduced without imposing a constraint on the degree of freedom in the location of the other component parts. In addition, the placing of the first oil filter 216 below the crankshaft 36 allows the motorcycle to have a lower gravity center.

In addition, the first oil filter 216 is placed in a position located closer to the center than the outer end 102a of the clutch apparatus 102 in the axial direction thereof so that the first oil filter 216, in the plan view, is laid over on a part of the clutch apparatus 102. Accordingly, the power unit P is prevented from becoming larger in the axial direction of the crankshaft 36 because of the attaching of the first oil filter 216. In addition, the protruding of the first oil filter 216 from the clutch cover 92 is prevented from affecting the bank angle.

In addition, the first oil filter 216 is placed in a position located below the crankshaft 36 and located farther to the center than of the clutch apparatus 102 when viewed along the axial direction of the clutch apparatus 102. Here, at least a part of the filtration material 243, which is a constituent element of the first oil filter 216, sticks outwards from the outer surface of the clutch cover 92 along the axial direction of the crankshaft 36. Accordingly, the first oil filter receives an air flow more efficiently. This results in a higher cooling performance for the first oil filter 216.

In addition, the first oil filter 216 is placed so that a part of the first oil filter 216 is laid over the water pump 208, the first and the second oil pumps 209 and 210, and the scavenging pump 211 when viewed from a side. Accordingly, the first oil pump 209 and the first oil filter 216 can be placed in a close proximity to each other. This makes it possible to shorten and simplify the oil channel 215 connecting the first oil pump 209 to the first oil filter 216.

In addition, the oil channels 237 and 238 connect the clutch apparatus 102 and the clutch control apparatus 220 that controls the hydraulic pressure applied to the clutch apparatus 102. The oil channels 237 and 238 are formed in the clutch cover 92. Accordingly, the clutch control apparatus 220 and the oil channels 237 and 238 that connect the clutch apparatus 102 to the clutch control apparatus 220 are disposed so as to be aggregated in the clutch cover 92. As a consequence, the oil channels 237 and 238 can be shortened and simplified while the maintenance work for the mechanisms to control the clutch apparatus 102 can be made easier.

In addition, the first oil filter 216 is placed at the opposite side of the vehicle frame F in the width direction thereof to the side stand 34. Accordingly, the maintenance work and the like done while the motorcycle is parked on the side stand becomes easier.

In addition, the pressure-reduction valve 222, which is installed in the course of the second branch oil channel 219 connecting the first oil filter 216 to the valve-lifting hydraulic control apparatus 221, is placed at a position in the close proximity to the first oil filter 216. Accordingly, while efficient use of the necessary hydraulic pressure is achieved, the pressure-reduction valve 222 and the first oil filter 216 are placed within a compact area.

In addition, the substantially cylindrical filter case 239 of the first oil filter 216 is attached to the crankcase 35 so as to stick outwards from the crankcase 35. At least a part of the pressure-reduction valve 222 is laid over the first oil filter 216 when viewed from the axial direction of the filter case 239. Accordingly, the pressure-reduction valve 222 and the first oil filter 216 are placed in a closer proximity to each other, and this contributes to the achievement of a more compact power unit P.

In addition, the first oil filter 216 and the pressure-reduction valve 222 are disposed in the clutch cover 92, which is attached to the crankcase 35. This results in a higher assembling performance. Moreover, the power unit P which includes the pressure-reduction valve 222 and the first oil filter 216 and a power unit which includes no pressure-reduction valves or no oil filters can use the identical engine main body 33. Thus, manufacturing of the two types of engines are made easier.

In addition, the ejection port of the first oil pump 209 is connected to all of the inlet-side and the exhaust-side valve-action-status changing mechanisms 63 and 64, and the clutch apparatus 102. Accordingly, the power unit P is prevented from becoming bulky. In addition it is possible to achieve a compact hydraulic system related to the inlet-side and the exhaust-side valve-action-status changing mechanisms 63 and 64, and the clutch apparatus 102. The power unit P, as a consequence, can be made suitable for motorcycles.

In addition, the pressure-reduction valve 222 is installed in the course of the second branch oil channel 219 which is communicatively connected to the valve-lifting hydraulic control apparatus 221 of the two hydraulic control mechanisms; the clutch control apparatus 220 and the valve-lifting hydraulic control apparatus 221. Accordingly, an appropriate and efficient control can be achieved for the hydraulic pressure of the clutch control apparatus 220 and for the hydraulic pressure of the valve-lifting hydraulic control apparatus 221.

In addition, the first and the second branch oil channels 218 and 219 branch out from the first oil pump 209 and are communicatively connected to the clutch control apparatus 220 and the valve-lifting hydraulic control apparatus 221. The pressure-reduction valve 222 is installed in the course of the second branch oil channel 219 of the two oil channels. Accordingly, an appropriate and efficient hydraulic system which adds suitable hydraulic pressure to the clutch control apparatus 220 and the valve-lifting hydraulic control apparatus 221 can be achieved.

In addition, the inlet-side and the exhaust-side valve-action-status changing mechanisms 63 and 64 can be operated to switch by means of a lower hydraulic pressure than in the case of the clutch apparatus 102. The hydraulic pressure to be supplied to the inlet-side and the exhaust-side valve-action-status changing mechanisms 63 and 64 is obtained by decreasing the hydraulic pressure of the oil ejected from the first oil pump 209 by means of the pressure-reduction valve 222. Accordingly, each hydraulic pressure that is appropriate for the inlet-side and the exhaust-side valve-action-status changing mechanisms 63 and 64, and for the clutch apparatus 102 can be applied, respectively.

Descriptions of an embodiment of the present invention has been given thus far, the embodiment that has been described above is not the only way of carrying out the invention. Various modifications in design are possible without departing from the present invention described in the scope of claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A structure for disposing a clutch control apparatus in a power unit for a saddle-ride type vehicle, comprising:
    an engine main body;
    a crankcase forming a part of the engine main body;
    a crankshaft rotatably supported by the crankcase and extending in a width wise direction of the vehicle;
    a clutch cover coupled to a lateral side surface of the crankcase;
    a clutch apparatus operatively connected to a power transmission from the crankshaft to a drive wheel for connecting and to disconnecting the transmission of torque of the crankshaft to the drive wheel;
    a clutch chamber in which the clutch apparatus is installed and which is formed between the crankcase and the clutch cover;
    a cylinder block forming a part of the engine main body together with the crankcase and coupled to the crankcase;
    a cylinder bore included in the cylinder block;
    a piston slidably fitted into the cylinder bore; and
    a clutch control apparatus for controlling the switching of the connection and disconnection actions of the clutch apparatus and which is attached to an outer surface of the clutch cover in a position at a lateral side of the cylinder block, and when viewed from the lateral side, the clutch control apparatus can be seen to overlap the cylinder bore.

2. The structure for disposing a clutch control apparatus in a power unit for a saddle-ride type vehicle according to claim 1, wherein
    the clutch apparatus is a twin-type clutch apparatus and includes first and second clutches;
    the clutch control apparatus includes a pair of individual control means for individually controlling the connection and disconnection of the first and the second clutches; and
    the clutch control apparatus is attached to the outer surface of the clutch cover while the two individual control means are disposed at different positions from each other both in a front-and-rear direction and in an up-and-down direction.

3. The structure for disposing a clutch control apparatus in a power unit for a saddle-ride type vehicle according to claim 2, wherein
    the engine main body is a V-type engine and includes a front-side bank positioned on a front side of the engine main body in a state of being mounted on the vehicle and a rear-side bank disposed at the rear side of the front-side bank; and
    the clutch control apparatus is disposed in a position at a side of the cylinder block located on the front-side bank side,
    when the clutch control apparatus is viewed from the lateral side, the two individual control means can be seen to be spaced apart from each other so as not overlap each other.

4. The structure for disposing a clutch control apparatus in a power unit for a saddle-ride type vehicle according to claim 2, wherein
    the clutch cover includes a protruding portion that protrudes outwards from the outer side along the axial of the clutch apparatus; and
    the clutch control apparatus is attached to the outer surface of the clutch cover in a position located closer to a center than an outermost end of the protruding portion.

5. The structure for disposing a clutch control apparatus in a power unit for a saddle-ride type vehicle according to claim 2, wherein the clutch control apparatus is disposed in a position farther to a center than the clutch apparatus when viewed along an axial direction of the clutch apparatus.

6. The structure for disposing a clutch control apparatus in a power unit for a saddle-ride type vehicle according to claim 2, wherein
    one of the two individual control means is disposed above the other one of the two individual control means and above the crankshaft; and
    the other one of the two individual control means is disposed in a position at a front of the crankshaft.

7. The structure for disposing a clutch control apparatus in a power unit for a saddle-ride type vehicle according to claim 6, wherein
    the clutch apparatus is hydraulic;
    the clutch control apparatus controls hydraulic pressure applied to the clutch apparatus; and
    an oil channel connecting the hydraulic clutch apparatus to the clutch control apparatus is formed in the clutch cover.

8. The structure for disposing a clutch control apparatus in a power unit for a saddle-ride type vehicle according to claim 2, wherein
    the clutch apparatus is hydraulic;
    the clutch control apparatus controls hydraulic pressure applied to the clutch apparatus; and
    an oil channel connecting the hydraulic clutch apparatus to the clutch control apparatus is formed in the clutch cover.

9. The structure for disposing a clutch control apparatus in a power unit for a saddle-ride type vehicle according to claim 1, wherein
    the clutch cover includes a protruding portion that protrudes outwards from the outer side along the axial of the clutch apparatus; and
    the clutch control apparatus is attached to the outer surface of the clutch cover in a position located closer to a center than an outermost end of the protruding portion.

10. The structure for disposing a clutch control apparatus in a power unit for a saddle-ride type vehicle according to claim 9, wherein
    the clutch apparatus is hydraulic;
    the clutch control apparatus controls hydraulic pressure applied to the clutch apparatus; and
    an oil channel connecting the hydraulic clutch apparatus to the clutch control apparatus is formed in the clutch cover.

11. The structure for disposing a clutch control apparatus in a power unit for a saddle-ride type vehicle according to claim 1, wherein the clutch control apparatus is disposed in a position farther to a center than the clutch apparatus when viewed along an axial direction of the clutch apparatus.

12. The structure for disposing a clutch control apparatus in a power unit for a saddle-ride type vehicle according to claim 11, wherein
the clutch apparatus is hydraulic;
the clutch control apparatus controls hydraulic pressure applied to the clutch apparatus; and
an oil channel connecting the hydraulic clutch apparatus to the clutch control apparatus is formed in the clutch cover.

13. The structure for disposing a clutch control apparatus in a power unit for a saddle-ride type vehicle according to claim 1, wherein
the clutch apparatus is hydraulic;
the clutch control apparatus controls hydraulic pressure applied to the clutch apparatus; and
an oil channel connecting the hydraulic clutch apparatus to the clutch control apparatus is formed in the clutch cover.

14. The structure for disposing a clutch control apparatus in a power unit for a saddle-ride type vehicle according to claim 1, wherein
the engine main body is a V-type engine and includes a front-side bank positioned on a front side of the engine main body in a state of being mounted on the vehicle and a rear-side bank disposed at the rear side of the front-side bank; and
the clutch control apparatus is disposed in a position at a side of the cylinder block located on the front-side bank side.

15. The structure for disposing a clutch control apparatus in a power unit for a saddle-ride type vehicle according to claim 1, wherein
the engine main body is a V-type engine and includes a front-side bank positioned on a front side of the engine main body in a state of being mounted on the vehicle and a rear-side bank disposed at the rear side of the front-side bank; and
the clutch control apparatus is disposed in a position at a side of the cylinder block located on the front-side bank side, and when viewed from the lateral side, the clutch control apparatus can be seen to overlap at least a portion of the cylinder bore in each of the front-side and rear-side banks.

16. A structure adapted for mounting a clutch control apparatus in a power unit for a saddle-ride vehicle, comprising:
a crankcase forming a part of an engine main body;
a clutch cover coupled to a lateral side surface of the crankcase;
a clutch apparatus operatively mounted within said clutch cover;
a clutch chamber in which the clutch apparatus is installed and which is formed between the crankcase and the clutch cover;
a cylinder block forming a part of the engine main body together with the crankcase and coupled to the crankcase;
a cylinder bore included in the cylinder block;
a piston slidably fitted into the cylinder bore; and
a clutch control apparatus for controlling the switching of a connection and a disconnection of the clutch apparatus and which is attached to an outer surface of the clutch cover in a position at a lateral side of the cylinder block, and when viewed from the lateral side, the clutch control apparatus can be seen to overlap the cylinder bore.

17. The structure for disposing a clutch control apparatus in a power unit for a saddle-ride type vehicle according to claim 16, wherein
the engine main body is a V-type engine and includes a front-side bank positioned on a front side of the engine main body in a state of being mounted on the vehicle and a rear-side bank disposed at the rear side of the front-side bank; and
the clutch control apparatus is disposed in a position at a side of the cylinder block located on the front-side bank side.

18. The structure for disposing a clutch control apparatus in a power unit for a saddle-ride type vehicle according to claim 16, wherein
the engine main body is a V-type engine and includes a front-side bank positioned on a front side of the engine main body in a state of being mounted on the vehicle and a rear-side bank disposed at the rear side of the front-side bank; and
the clutch control apparatus is disposed in a position at a side of the cylinder block located on the front-side bank side, and when viewed from the lateral side, the clutch control apparatus can be seen to overlap at least a portion of the cylinder bore in each of the front-side and rear-side banks.

19. The structure adapted for mounting a clutch control apparatus in a power unit for a saddle-ride type vehicle according to claim 16, wherein
the clutch apparatus is a twin-type clutch apparatus and includes first and second clutches;
the clutch control apparatus includes a pair of individual control means for individually controlling the connection and disconnection of the first and the second clutches; and
the clutch control apparatus is attached to the outer surface of the clutch cover while the two individual control means are disposed at different positions from each other both in a front-and-rear direction and in an up-and-down direction.

20. The structure for disposing a clutch control apparatus in a power unit for a saddle-ride type vehicle according to claim 19, wherein
the engine main body is a V-type engine and includes a front-side bank positioned on a front side of the engine main body in a state of being mounted on the vehicle and a rear-side bank disposed at the rear side of the front-side bank; and
the clutch control apparatus is disposed in a position at a side of the cylinder block located on the front-side bank side, and
when the clutch control apparatus is viewed from the lateral side, the two individual control means can be seen to be spaced apart from each other so as not overlap each other.

* * * * *